(12) United States Patent
Wargin et al.

(10) Patent No.: US 8,401,896 B2
(45) Date of Patent: *Mar. 19, 2013

(54) AUTOMATED TASK PROCESSOR FOR INSURANCE CLAIMS

(75) Inventors: Jeffrey Michael Wargin, Rancho Palos Verdes, CA (US); David R. Dahle, Wynnewood, PA (US); Jeffrey G. Weiss, Buffalo Grove, IL (US)

(73) Assignee: Accenture Global Services Limited, Dublin (IE)

( * ) Notice: Subject to any disclaimer, the term of this patent is extended or adjusted under 35 U.S.C. 154(b) by 4 days.

This patent is subject to a terminal disclaimer.

(21) Appl. No.: 13/426,401

(22) Filed: Mar. 21, 2012

(65) Prior Publication Data

US 2012/0179496 A1 Jul. 12, 2012

Related U.S. Application Data

(63) Continuation of application No. 13/071,347, filed on Mar. 24, 2011, now Pat. No. 8,180,668, which is a continuation of application No. 11/264,115, filed on Nov. 1, 2005, now Pat. No. 7,933,786.

(51) Int. Cl.
*G06Q 40/00* (2012.01)
(52) U.S. Cl. ........................................................ 705/14
(58) Field of Classification Search .................... 705/14, 705/4
See application file for complete search history.

(56) References Cited

U.S. PATENT DOCUMENTS

| | | |
|---|---|---|
| 4,648,037 A | 3/1987 | Valentino |
| 4,713,755 A | 12/1987 | Worley, Jr. et al. |
| 4,796,181 A | 1/1989 | Wiedemer |
| 4,831,526 A | 5/1989 | Luchs et al. |
| 4,975,840 A | 12/1990 | DeTore et al. |
| 5,093,794 A | 3/1992 | Howie et al. |
| 5,128,859 A | 7/1992 | Carbone et al. |
| 5,181,162 A | 1/1993 | Smith et al. |
| 5,182,705 A | 1/1993 | Barr et al. |
| 5,191,522 A | 3/1993 | Bosco et al. |
| 5,208,748 A | 5/1993 | Flores et al. |
| 5,216,603 A | 6/1993 | Flores et al. |

(Continued)

FOREIGN PATENT DOCUMENTS

| | | |
|---|---|---|
| EP | 0841612 A2 | 5/1998 |
| EP | 0844558 A2 | 5/1998 |

(Continued)

OTHER PUBLICATIONS

Georgakopoulos et al.: An Overview of Workflow Management: From Process Modeling to Workflow Automation Infrastructure, 1995, Distributed and Parallel Databases, 3, pp. 119-153.*

(Continued)

*Primary Examiner* — Bijendra K Shrestha
(74) *Attorney, Agent, or Firm* — Brinks Hofer Gilson & Lione

(57) ABSTRACT

An insurance claim processing system may include an insurance claim database and an automated task processor. The insurance claim database may be configured to store and provide access to data in a data record that is related to an insurance claim. The automated task processor may be executable with a computer to identify an insurance claim processing task from the insurance claim database, and obtain insurance claim data related to the identified insurance claim processing task. The automated task processor may also select an action plan from an action plan database based on the obtained insurance claim data. The automated task processor may also identify a set of one or more automated procedures included in the action plan, and cause execution of the identified set of procedures included in the action plan.

20 Claims, 5 Drawing Sheets

U.S. PATENT DOCUMENTS

| | | |
|---|---|---|
| 5,241,664 A | 8/1993 | Ohba et al. |
| 5,253,362 A | 10/1993 | Nolan et al. |
| 5,307,262 A | 4/1994 | Ertel |
| 5,325,291 A | 6/1994 | Garrett et al. |
| 5,367,619 A | 11/1994 | Dipaolo et al. |
| 5,392,428 A | 2/1995 | Robins |
| 5,404,518 A | 4/1995 | Gilbertson et al. |
| 5,420,973 A | 5/1995 | Dagdeviren |
| 5,445,653 A | 8/1995 | Hixson et al. |
| 5,446,653 A | 8/1995 | Miller et al. |
| 5,523,942 A | 6/1996 | Tyler et al. |
| 5,530,861 A | 6/1996 | Diamant et al. |
| 5,557,515 A | 9/1996 | Abbruzzese et al. |
| 5,581,682 A | 12/1996 | Anderson et al. |
| 5,592,611 A | 1/1997 | Midgely et al. |
| 5,613,108 A | 3/1997 | Morikawa |
| 5,627,764 A | 5/1997 | Schutzman et al. |
| 5,630,069 A | 5/1997 | Flores et al. |
| 5,632,015 A | 5/1997 | Zimowski et al. |
| 5,640,501 A | 6/1997 | Turpin |
| 5,649,182 A | 7/1997 | Reitz |
| 5,655,085 A | 8/1997 | Ryan et al. |
| 5,664,109 A | 9/1997 | Johnson et al. |
| 5,671,360 A | 9/1997 | Hambrick et al. |
| 5,673,402 A | 9/1997 | Ryan et al. |
| 5,675,745 A | 10/1997 | Oku et al. |
| 5,687,385 A | 11/1997 | Janay |
| 5,692,501 A | 12/1997 | Minturn |
| 5,701,400 A | 12/1997 | Amado |
| 5,706,452 A | 1/1998 | Ivanov |
| 5,721,913 A | 2/1998 | Ackroff et al. |
| 5,721,940 A | 2/1998 | Luther et al. |
| 5,724,575 A | 3/1998 | Hoover et al. |
| 5,726,884 A | 3/1998 | Sturgeon et al. |
| 5,734,837 A | 3/1998 | Flores et al. |
| 5,742,836 A | 4/1998 | Turpin et al. |
| 5,745,687 A | 4/1998 | Randell |
| 5,745,901 A | 4/1998 | Entner et al. |
| 5,752,055 A | 5/1998 | Redpath et al. |
| 5,758,351 A | 5/1998 | Gibson et al. |
| 5,765,170 A | 6/1998 | Morikawa |
| 5,768,506 A | 6/1998 | Randell |
| 5,790,116 A | 8/1998 | Malone et al. |
| 5,799,297 A | 8/1998 | Goodridge et al. |
| 5,809,318 A | 9/1998 | Rivette et al. |
| 5,809,478 A | 9/1998 | Greco et al. |
| 5,819,230 A | 10/1998 | Christie et al. |
| 5,826,020 A | 10/1998 | Randell |
| 5,826,237 A | 10/1998 | Macrae et al. |
| 5,826,239 A | 10/1998 | Du et al. |
| 5,836,011 A | 11/1998 | Hambrick et al. |
| 5,839,112 A | 11/1998 | Schreitmueller et al. |
| 5,845,289 A | 12/1998 | Baumeister et al. |
| 5,848,271 A | 12/1998 | Caruso et al. |
| 5,848,393 A | 12/1998 | Goodridge et al. |
| 5,855,005 A | 12/1998 | Schuler et al. |
| 5,860,066 A | 1/1999 | Rouse |
| 5,862,327 A | 1/1999 | Kwang et al. |
| 5,867,385 A | 2/1999 | Brown et al. |
| 5,870,711 A | 2/1999 | Huffman |
| 5,873,066 A | 2/1999 | Underwood et al. |
| 5,875,330 A | 2/1999 | Goti |
| 5,881,230 A | 3/1999 | Christensen et al. |
| 5,884,256 A | 3/1999 | Bennett et al. |
| 5,886,693 A | 3/1999 | Ho et al. |
| 5,890,130 A | 3/1999 | Cox et al. |
| 5,890,133 A | 3/1999 | Ernst |
| 5,899,989 A | 5/1999 | Ikeuchi et al. |
| 5,903,873 A | 5/1999 | Peterson et al. |
| 5,907,828 A | 5/1999 | Meyer et al. |
| 5,920,696 A | 7/1999 | Brandt et al. |
| 5,925,100 A | 7/1999 | Drewry et al. |
| 5,940,804 A | 8/1999 | Turley et al. |
| 5,946,694 A | 8/1999 | Copeland et al. |
| 5,950,169 A | 9/1999 | Borghesi et al. |
| 5,956,687 A | 9/1999 | Wamsley et al. |
| 5,970,464 A | 10/1999 | Apte et al. |
| 5,974,390 A | 10/1999 | Ross |
| 5,987,247 A | 11/1999 | Lau |
| 5,991,733 A | 11/1999 | Aleia et al. |
| 5,999,911 A | 12/1999 | Berg et al. |
| 6,002,396 A | 12/1999 | Davies |
| 6,003,007 A | 12/1999 | DiRienzo |
| 6,003,011 A | 12/1999 | Sarin et al. |
| 6,012,066 A | 1/2000 | Discount et al. |
| 6,021,418 A | 2/2000 | Brandt et al. |
| 6,023,572 A | 2/2000 | Lautzenheiser et al. |
| 6,023,578 A | 2/2000 | Birsan et al. |
| 6,028,997 A | 2/2000 | Leymann et al. |
| 6,038,590 A | 3/2000 | Gish |
| 6,041,304 A | 3/2000 | Meyer et al. |
| 6,044,382 A | 3/2000 | Martino |
| 6,044,384 A | 3/2000 | Ishima et al. |
| 6,049,773 A | 4/2000 | McCormack et al. |
| 6,055,519 A | 4/2000 | Kennedy et al. |
| 6,058,413 A | 5/2000 | Flores et al. |
| 6,061,665 A | 5/2000 | Bahreman et al. |
| 6,065,000 A | 5/2000 | Jensen |
| 6,065,009 A | 5/2000 | Leymann et al. |
| 6,067,525 A | 5/2000 | Johnson et al. |
| 6,070,152 A | 5/2000 | Carey et al. |
| 6,073,109 A | 6/2000 | Flores et al. |
| 6,076,066 A | 6/2000 | DiRienzo et al. |
| 6,078,890 A | 6/2000 | Mangin et al. |
| 6,098,070 A | 8/2000 | Maxwell |
| 6,108,673 A | 8/2000 | Brandt et al. |
| 6,112,190 A | 8/2000 | Fletcher et al. |
| 6,115,646 A | 9/2000 | Fiszman et al. |
| 6,119,093 A | 9/2000 | Walker et al. |
| 6,125,363 A | 9/2000 | Buzzeo et al. |
| 6,131,155 A | 10/2000 | Alexander et al. |
| 6,134,536 A | 10/2000 | Shepherd |
| 6,141,011 A | 10/2000 | Bodnar et al. |
| 6,151,660 A | 11/2000 | Aoki |
| 6,158,044 A | 12/2000 | Tibbetts |
| 6,163,781 A | 12/2000 | Wess, Jr. |
| 6,163,784 A | 12/2000 | Taguchi |
| 6,170,002 B1 | 1/2001 | Ouchi |
| 6,182,274 B1 | 1/2001 | Lau |
| 6,199,099 B1 | 3/2001 | Gershman et al. |
| 6,223,164 B1 | 4/2001 | Seare et al. |
| 6,230,169 B1 | 5/2001 | Nagae |
| 6,233,537 B1 | 5/2001 | Gryphon et al. |
| 6,253,369 B1 | 6/2001 | Cloud et al. |
| 6,256,636 B1 | 7/2001 | Choy |
| 6,266,645 B1 | 7/2001 | Simpson |
| 6,266,666 B1 | 7/2001 | Ireland et al. |
| 6,272,482 B1 | 8/2001 | McKee et al. |
| 6,278,977 B1 | 8/2001 | Agrawal et al. |
| 6,279,009 B1 | 8/2001 | Smirnov et al. |
| 6,289,348 B1 | 9/2001 | Richard et al. |
| 6,289,385 B1 | 9/2001 | Whipple et al. |
| 6,308,224 B1 | 10/2001 | Leymann et al. |
| 6,311,192 B1 | 10/2001 | Rosenthal et al. |
| 6,321,133 B1 | 11/2001 | Smirnov et al. |
| 6,321,374 B1 | 11/2001 | Choy |
| 6,327,046 B1 | 12/2001 | Miyamoto et al. |
| 6,330,541 B1 | 12/2001 | Meyer et al. |
| 6,332,155 B1 | 12/2001 | Notani |
| 6,334,146 B1 | 12/2001 | Parasnis et al. |
| 6,336,096 B1 | 1/2002 | Jernberg |
| 6,343,271 B1 | 1/2002 | Peterson et al. |
| 6,347,303 B2 | 2/2002 | Nagai et al. |
| 6,349,238 B1 | 2/2002 | Gabbita et al. |
| 6,349,320 B1 | 2/2002 | Emberton et al. |
| 6,356,905 B1 | 3/2002 | Gershman et al. |
| 6,370,508 B2 | 4/2002 | Beck et al. |
| 6,380,951 B1 | 4/2002 | Petchenkine et al. |
| 6,389,588 B1 | 5/2002 | Wadhwa et al. |
| 6,393,431 B1 | 5/2002 | Salvati et al. |
| 6,393,456 B1 | 5/2002 | Ambler et al. |
| 6,397,191 B1 | 5/2002 | Notani et al. |
| 6,397,192 B1 | 5/2002 | Notani et al. |
| 6,415,259 B1 | 7/2002 | Wolfinger et al. |
| 6,426,759 B1 | 7/2002 | Ting et al. |
| 6,442,528 B1 | 8/2002 | Notani et al. |
| 6,442,557 B1 | 8/2002 | Buteau et al. |

| | | |
|---|---|---|
| 6,442,563 B1 | 8/2002 | Bacon et al. |
| 6,470,303 B2 | 10/2002 | Kidd et al. |
| 6,493,675 B1 | 12/2002 | Kanaya et al. |
| 6,501,832 B1 | 12/2002 | Saylor et al. |
| 6,505,176 B2 | 1/2003 | De Francesco, Jr. et al. |
| 6,516,322 B1 | 2/2003 | Meredith |
| 6,519,578 B1 | 2/2003 | Reddy |
| 6,535,883 B1 | 3/2003 | Lee et al. |
| 6,546,396 B1 | 4/2003 | Borkowski et al. |
| 6,549,893 B1 | 4/2003 | Lannert et al. |
| 6,567,783 B1 | 5/2003 | Notani et al. |
| 6,574,636 B1 | 6/2003 | Balon et al. ............... 707/103 |
| 6,606,740 B1 | 8/2003 | Lynn et al. |
| 6,625,602 B1 | 9/2003 | Meredith et al. |
| 6,632,251 B1 | 10/2003 | Rutten et al. |
| 6,651,060 B1 | 11/2003 | Harper et al. |
| 6,671,692 B1 | 12/2003 | Marpe et al. |
| 6,671,693 B1 | 12/2003 | Marpe et al. |
| 6,671,716 B1 | 12/2003 | Diedrichsen et al. |
| 6,679,959 B2 | 1/2004 | Boyd et al. |
| 6,684,190 B1 | 1/2004 | Powers et al. |
| 6,687,557 B2 | 2/2004 | Ouchi |
| 6,687,878 B1 | 2/2004 | Eintracht et al. |
| 6,697,784 B2 | 2/2004 | Bacon et al. |
| 6,714,914 B1 | 3/2004 | Peters et al. |
| 6,725,224 B1 | 4/2004 | McCarthy et al. |
| 6,728,947 B1 | 4/2004 | Bengston |
| 6,738,736 B1 | 5/2004 | Bond |
| 6,738,757 B1 | 5/2004 | Wynne et al. |
| 6,763,353 B2 | 7/2004 | Li et al. |
| 6,768,984 B2 | 7/2004 | Allen et al. |
| 6,769,112 B1 | 7/2004 | Montana et al. |
| 6,810,383 B1 | 10/2004 | Loveland |
| 6,826,579 B1 | 11/2004 | Leymann et al. |
| 6,832,368 B1 | 12/2004 | Zimowski |
| 6,862,732 B1 | 3/2005 | Schultz et al. |
| 6,868,193 B1 | 3/2005 | Gharbia et al. |
| 6,874,008 B1 | 3/2005 | Eason et al. |
| 6,877,153 B2 | 4/2005 | Konnersman |
| 6,879,959 B1 | 4/2005 | Chapman et al. |
| 6,888,929 B1 | 5/2005 | Saylor et al. |
| 6,889,375 B1 | 5/2005 | Chan et al. |
| 6,895,084 B1 | 5/2005 | Saylor et al. |
| 6,896,574 B2 | 5/2005 | Needham et al. |
| 6,898,574 B1 | 5/2005 | Regan |
| 6,901,405 B1 | 5/2005 | McCrady et al. |
| 6,918,053 B1 | 7/2005 | Thatte et al. |
| 6,920,456 B2 | 7/2005 | Lee et al. |
| 6,925,593 B1 | 8/2005 | Knutson et al. |
| 6,928,487 B2 | 8/2005 | Eggebraaten et al. |
| 6,937,990 B1 | 8/2005 | Walker et al. |
| 6,938,030 B1 | 8/2005 | Simone, Jr. et al. |
| 6,944,603 B2 | 9/2005 | Bergan et al. |
| 6,950,801 B2 | 9/2005 | Brookes et al. |
| 6,952,679 B1 | 10/2005 | Pulford |
| 6,970,931 B1 | 11/2005 | Bellamy et al. |
| 6,975,914 B2 | 12/2005 | DeRemer et al. |
| 6,993,528 B1 | 1/2006 | Aver et al. |
| 7,000,186 B1 | 2/2006 | Gropper et al. |
| 7,007,227 B1 | 2/2006 | Constantino et al. |
| 7,013,284 B2 | 3/2006 | Guyan et al. ............... 705/9 |
| 7,013,309 B2 | 3/2006 | Chakraborty et al. |
| 7,039,597 B1 | 5/2006 | Notani et al. |
| 7,047,535 B2 | 5/2006 | Lee et al. |
| 7,051,036 B2 | 5/2006 | Rosnow et al. |
| 7,051,071 B2 | 5/2006 | Stewart et al. |
| 7,051,072 B2 | 5/2006 | Stewart et al. |
| 7,051,074 B1 | 5/2006 | Buchsbaum et al. |
| 7,054,887 B2 | 5/2006 | Kozina |
| 7,065,504 B2 | 6/2006 | Sakuma et al. |
| 7,069,536 B2 | 6/2006 | Yaung |
| 7,076,504 B1 | 7/2006 | Handel et al. |
| 7,100,147 B2 | 8/2006 | Miller et al. |
| 7,110,952 B2 | 9/2006 | Kursh |
| 7,113,913 B1 | 9/2006 | Davis et al. |
| 7,117,271 B2 | 10/2006 | Haverstock et al. |
| 7,124,203 B2 | 10/2006 | Joshi et al. |
| 7,150,000 B2 | 12/2006 | Feldman |
| 7,171,647 B1 | 1/2007 | Smith et al. |
| 7,181,427 B1 | 2/2007 | De Francesco et al. |
| 7,184,967 B1 | 2/2007 | Mital et al. |
| 7,188,073 B1 | 3/2007 | Tam et al. |
| 7,194,679 B1 | 3/2007 | Green |
| 7,203,654 B2 | 4/2007 | Menendez |
| 7,216,163 B2 | 5/2007 | Sinn |
| 7,219,050 B2 | 5/2007 | Ishikawa et al. |
| 7,228,547 B2 | 6/2007 | Yaung |
| 7,242,991 B2 | 7/2007 | Budinger et al. |
| 7,249,157 B2 | 7/2007 | Stewart et al. |
| 7,249,180 B2 | 7/2007 | Erickson et al. |
| 7,269,621 B2 | 9/2007 | Chang et al. |
| 7,269,718 B2 | 9/2007 | Alexander, III et al. |
| 7,296,056 B2 | 11/2007 | Yaung |
| 7,305,488 B2 | 12/2007 | Wallace et al. |
| 7,310,607 B2 | 12/2007 | Brandt et al. |
| 7,337,121 B1 | 2/2008 | Beinat et al. ............... 705/3 |
| 7,398,218 B1 | 7/2008 | Bernaski et al. ............... 705/3 |
| 7,440,978 B2 | 10/2008 | Chan et al. |
| 7,617,240 B2 | 11/2009 | Guyan et al. ............... 707/104.1 |
| 7,933,786 B2 | 4/2011 | Wargin et al. ............... 705/4 |
| 7,979,382 B2 | 7/2011 | Guyan et al. ............... 707/104.1 |
| 8,126,742 B2 | 2/2012 | Bond, Jr. et al. ............... 705/4 |
| 8,180,668 B2 | 5/2012 | Wargin et al. ............... 705/14 |
| 2002/0035488 A1 | 3/2002 | Aquila et al. ............... 705/4 |
| 2002/0165739 A1 | 11/2002 | Guyan et al. ............... 705/4 |
| 2002/0188674 A1 | 12/2002 | Brown et al. |
| 2003/0009357 A1 | 1/2003 | Pish ............... 705/4 |
| 2003/0154172 A1 | 8/2003 | Guyan et al. ............... 705/80 |
| 2003/0200527 A1 | 10/2003 | Lynn et al. |
| 2004/0225535 A1 | 11/2004 | Bond et al. ............... 705/4 |
| 2005/0149376 A1 | 7/2005 | Guyan et al. ............... 705/9 |
| 2005/0246206 A1 | 11/2005 | Obora et al. |
| 2006/0155622 A1 | 7/2006 | Laux |
| 2006/0218017 A1 | 9/2006 | Ren et al. |
| 2007/0005463 A1 | 1/2007 | Davis et al. |
| 2007/0156463 A1 | 7/2007 | Burton et al. |
| 2007/0255601 A1 | 11/2007 | Heydon et al. |
| 2010/0205013 A1 | 8/2010 | Guyan et al. ............... 705/4 |

FOREIGN PATENT DOCUMENTS

| | | |
|---|---|---|
| EP | 0854431 A2 | 7/1998 |
| EP | 0897149 A1 | 2/1999 |
| EP | 1 688 880 A2 * | 5/2000 |
| JP | 11-353234 A2 | 12/1999 |
| WO | WO 8401448 A1 | 4/1984 |
| WO | WO 9108543 A1 | 6/1991 |
| WO | WO 9300643 A1 | 1/1993 |
| WO | WO 9416395 A1 | 7/1994 |
| WO | WO 9503569 A2 | 2/1995 |
| WO | WO 9631828 A1 | 10/1996 |
| WO | WO 9812616 A2 | 3/1998 |
| WO | WO 9821680 A1 | 5/1998 |
| WO | WO 9838563 A2 | 9/1998 |
| WO | WO 0067180 A2 | 11/2000 |
| WO | WO 0067181 A2 | 11/2000 |
| WO | WO 0067182 A2 | 11/2000 |
| WO | WO 0067184 A2 | 11/2000 |
| WO | WO 0067186 A2 | 11/2000 |

OTHER PUBLICATIONS

Williams et al.: A Case Study of Knowledge Acquisition of Insurance Risk assessment using a KDD Methodology, Oct. 1996, SSIRO Division of Information Technology, Australia, pp. 1-11.*
International Search Report dated Apr. 17, 2002, for PCT Application No. PCT/US00/12351, filed May 4, 2000. 5 pages.
International Search Report dated Jun. 3, 2002, for corresponding international application PCT/US00/12240. 2 pages.
International Search Report dated Aug. 6, 2002, for PCT Application No. PCT/US00/12501, filed May 4, 2000. 3 pages.
International Search Report dated Aug. 8, 2002 for PCT/US00/12508, 2 pages.
International Search Report dated Dec. 9, 2002 for PCT/US00/12238, 2 pages.
European Examination Report dated Feb. 18, 2004, for European Patent Application No. 00928844.0, filed May 4, 2000. 4 pages.
European Examination Report dated Feb. 1, 2005, for European Patent Application No. 00928844.0, filed May 4, 2000. 16 pages.

Extended European Search Report for European Patent Application No. 06005193.5, dated Aug. 22, 2006, 8 pages.

Agarwal et al., Architecting Object Applications for High Performance with Relational Databases, High Performance Object/Relational Applications. Aug. 10, 1995, 8 pages.

Bandat, K, "Document Based Customization and Adaptation of Process" *IBM Technical Disclosure Bulletin*, Sep. 1994, pp. 629-630.

Bulletin of the Technical Committee on Data Engineering, *IEEE Computer Society*, vol. 16 No. 2, Jun. 1993, pp. 1-56.

Claims Technology, A Five-Step Diagnosis for Your Claim Operation by John Raguin, available at http://web/archive.org/20040808072822/www.claimsmag.com/Issues/sept02/claims_tech.asp (Sep. 2002). 3 pages.

Cugola, G., et al., "Exploiting an event-based infrastructure to develop complex distributed systems," Software Engineering, 1988; Proceedings of the 1988 International Conference on Kyoto, Japan, Apr. 19-25, 1998, IEEE pp. 261-270.

Denning, Peter J. et al. "Completing the Loops," *INTERFACES: Institute for Operatinos Research and the Management Science*, vol. 25, No. 3, May-Jun. 1995. pp. 42-57.

Engel, James D., "Technology in claims management", *Risk Management*, vol. 42 No. 12. Dec. 1995, 2 pages.

Feiler, Peter H. et al. "An Incremental Programming Environment," *Proceedings of the 5th International Conference on Software Engineering*, San Diego, California, 1981. pp. 44-53.

Fisher, Susan, E., "Insurer streamlines info gathering" (Client/Server Deployment: Arkwright Mutual Insurance) *PC Week*, vol. 10 No. 45, Nov. 15, 1993. 2 pages.

Freeman, Charles, "Microsoft Access 97 Step by Step," published by Microsoft Press, 1997, Table of Contents and Quick Look Guide vii-xiv, Finding You Best Starting Point pp. xvi-xxvi, Part 1, Lesson 1 and Lesson 2, pp. Cover-40, 63-108, 251-254.

Groiss, Herbert, et al., "Interoperability with World Wide Workflows," *1st World Conference on Integrated Design & Process Technology*, 1995, pp. 1-7.

Held, Jeffrey J., Network Computing Practice, "GroupWare in Investment Banking: Improving Revenue and Deal Flow", *GroupWare '92*, Edited by David D. Coleman, The Conference Group, Morgan Kaufmann Publishers, 1992, pp. 461-464.

Hung K. Sun Y. Rose T. "A dynamic business object architecture for an insurance industrial project." *Proceedings of International Conference on Object Oriented Information Systems, (OOIS'97)*. Brisbane, Qld., Australia Nov. 10-12, 1997, Published 1998, abstract 1 page.

Image-Enabled App Streams Workflow for Gerling Re.(Gerling Global Reinsurance's use of keyFile's document management software and insurance Software and Systems' SICS insurance record-keeping software)(Product Information).*Insurance & Technology*, Feb. 1, 1997, 3 pages.

Kappel, G. et al., "Coordination in Workflow Management Systems a Rule-Based Approach", *Department of Information Systems, University of Linz, A-4040 Linz*, Austria, 1998, pp. 99-119.

Kellogg et al. "Interface management: a CORBA universal service manager," *Systems Management*, 1998. Proceedings of the IEEE Third International Workshop on Newport, RI, USA, Apr. 22-24, 1998, Los Alamitos, CA, USA, IEEE Comput. Soc., US, Apr. 22, 1998. pp. 148-149.

Koehler SH, "Objects in Insurance. Gaining the Competitive Edge in Financial Services." *Proceedings of OBJECT EXPO '94*. New York, NY, USA Jun. 6-10, 1994, Published 1994. Abstract, 1 page.

Korzeniowski, Paul, "Workflow software automates processes; passing messages on network platform helps CareAmerica process insurance claims" (use of workflow software to streamline business processes) (Client/Service Computing), *Software Magazine*, vol. 13 No. 3. Feb. 1993, 4 pages.

Koschel et al. "Configurable event triggered services for CORB-based systems," *Enterprise Distributed Object Computing Workshop*, 1998. EDOC '98 Proceedings, Second International La Jolla, CA, USA, Nov. 3-5, 1998. New York, NY, USA, IEEE, US, Nov. 1998, pp. 306-318.

Medina-Mora, Raul et al. "ALOE Users' and Implentors' Guide," *Technical Report CMUCS-81-145, CMU, Computer Science Department*, Nov. 1981. pp. I-III and 1-79.

Medina-Mora, Raul "Syntax-Directed Editing Towards Integrated Programming Environments," *Doctoral Thesis, Department of Computer Science, Carnegie-Mellon University*. Mar. 1982, Summary pp. 1-14 and pp. 1-149.

Medina-Mora, "Action Workflow™ Technology and Applications for Groupware" *Group Ware '92*, Edited by David D. Coleman, The Conference Group, Morgan Kaufmann Publishers, 1992. pp. 165-167.

Medina-Mora, Raul et al. "The Action Workflow Approach to Workflow Management Technology," *Proceedings of the 1992 ACM conference on Computer-supported cooperative work*, Nov. 1992. pp. 281-288.

Medina-Mora, Raul et al. "ActionWorkflow in Use: Clark County Department of Business License," *Proceedings of the Twelfth International Conference on Data Engineering*, Feb.-Mar. 1996, pp. 288-294.

Medina-Mora, Raul, et al. "Action Workflow as the Enterprise Integration Technology." Bulletin of the Technical Committee on Data Engineering. *IEEE Computer Societ*. vol. 16 No. 2, pp. 49-52. Jun. 1993.

Milligan, John. "Case study: Advantage. (Motorists Insurance Companies uses Advantage, a business-rule DBMS developed in-house, to manage quoting, data entry, rating and other core processes)" (Data Architect) (Company Operations). *Database Programming & Design*, vol. 10 No. 12, Dec. 1997, 5 pages.

Nilsson, Y. "TFM: a tool for task flow management." *Philips Telecommunication and Data Systems Review*, vol. 47, No. 4, Dec. 1989, pp. 33-46. Netherlands, Abstract.

Potel, M. "MVP: Model-View-Presenter the Taligent Programming Model for C++ and Java," Taligent, Inc., 1994, 16 pages.

"Primavera Extends Lead in High-End Project Management Software," *Business Wire*, Apr. 4, 1995. 3 pages.

"*Primavera Products and Solutions*," www.primavera.com/products/p3.html, downloaded from internet Feb. 2, 2001, 2 pages.

Publishing A FileMaker Pro 4/5, Database on the Web: A tutorial, available at http://ion.uillinois.edu/resources/tutorials/software/tutorials/fmpro/filemakertutorial1.doc (last updated May 21, 2000). 10 pages.

Robert W. Baldwin, Naming and Grouping Privileges to Simplify Security Management in Large Databases, available at http://www.cs.purdue.edu/homes/ninghui/courses/Fall03/papers/baldwin.pdf (Copyrighted in 1990). 17 pages.

Stickel E., "Competitive product development in the financial services industry-a knowledge-based approach" *International Journal of Intelligent Systems in Accounting, Finance and Management*, vol. 4, No. 4, Dec. 1995, pp. 273-87, abstract 1 page.

Sutherland, RW, "TABLE Driven Health Insurance Claim Preparation" *IBM Technical Disclosure Bulletin*, Jul. 1986, abstract 1 page.

Tauhert, Christy, "AFLAC cuts processing time with object system. (American Family Life Assurance, Portable Systems Technology's SmartImage insurance processing automation system) (Company Operations)". *Insurance & Technology*, vol. 22 No. 6, Jun. 1997, pp. 25(2) abstract, 1 page.

Todd, G. et al. "Microsoft Exchange Server 5.5", published by SAMS publishing, Indianapolis, Indiana, 1998, pp. i-xliii and 1-1060.

Tombros, Dimitrios et al., "Semantics of Reactive Components in Event-Driven Workflow EXecution", *Institut for Informatic, Universitat Zurich, Advanced Information systems Engineering, 9th International Conference, SAiSE '97*, Barcelona,Catalonia, Spain, Jun. 16-20, 1997 Proceedings, pp. 409-422.

Tsai, W.H. et al. "Architecture of a Multi-Microprocessor System for Parallel Processing of Image Sequences," *Proceedings of 1981 IEEE Computer Society Workshop on Computer Architecture of Pattern Analysis and Image Database Management*, 1981. pp. 104-111.

Tsuchiya et al. "Operator-oriented approach for the inter-work of service and network management," *Global Convergence of Telecommunications and Distributed Object Computing*, 1997. Proceedings. Tine 97 Santiago, Chile, Nov. 17-20, 1997, Los Alamitos, CA, USA, EEE Comput. Soc., US, Nov. 17, 1997. pp. 144-150.

Vendor branches, Chapter 7. Advanced Topics, available at http://svnbook.red-bean.com/en/1.1/ch07s05.html (6 pages) (abailable as early as Nov. 2005).

Way, P. John Hancock streamlines legacy systems with objects. (John Hancock Mutual Life Insurance)(Company Operations). *Insurance & Technology* vol. 22. No. 9 Sep. 1997. Abstract, 1 page.

Winograd, Terry et al. (1986) Understanding Computers and Cognition: A New Foundation for Design, Ablex Publishing Corporation, Norwood, New Jersey, 1986. pp. i-xii and 1-207.

Winograd, Terry "A Language/Action Perspective on the Design of Cooperative Work," *Published in Human-Computer Interaction* vol. 3 No. 1, 1987-88, 15 pages.

Winograd, Terry, "Groupware and the Emergence of Business Technology", *Group Ware '92*, Edited by David D. Coleman, The Conference Group, Morgan Kaufmann Publishers, 1992, pp. 69-72.

"Report on the Filing or Determination of an Action Regarding a Patent or Trademark," identifying U.S. Patent No. 7,013,284 B2 asserted in *Accenture Global Services GmbH, et al. v. Guidewire Software, Inc.*, Dkt. No. 07cv826, D. Del. Dec. 18, 2007. 1 page.

"Answers and Counterclaims," filed on Feb. 6, 2008 in lawsuit asserting U.S. Patent No. 7,013,284 B2, captioned *Accenture Global Services GmbH, et al. v. Guidewire Software, Inc.*, Dkt. No. 07cv826, D. Del. Dec. 18, 2007, 25 pages.

Accenture's Reply to Guidewire's Counterclaims with Defenses filed Mar. 25, 2008, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 13 pages. (Dkt. No. 19).

Defendant Guidewire Software Inc.'s Objections and Response to Plaintiff Accenture's First Set of Interrogatories, Aug. 22, 2008, in lawsuit asserting U.S. Patent No. 7,013,284 B2, captioned *Accenture Global Services GmbH, et al. v. Guidewire Software, Inc.*, Dkt. No. 07cv826, D. Del. Dec. 18, 2007. pp. 1-5.

Accenture's Amended Complaint for Patent Infringement, Trade Secret Misappropriation, and related State Law Claims filed Nov. 13, 2008, in lawsuit asserting U.S. Patent No. 7,013,284 B2, captioned *Accenture Global Services GmbH, et al. v. Guidewire Software, Inc.*, Case No. 07cv826, D. Del, Dec. 18, 2007. 17 pages. (Dkt. No. 79).

Accenture's Second Amended Complaint for Patent Infringement, Trade Secret Misappropriation, and related State Law Claims filed Dec. 17, 2008, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007, 19 pages. (Dkt. No. 92).

Guidewire's Answer to Second Amended Complaint filed Jan. 9, 2009, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007, 19 pages. (Dkt. No. 100).

Accenture's Reply to Guidewire's Counterclaims with Defenses to Accenture's Second Amended Complaint filed Jan. 29, 2009, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 9 pages. (Dkt. No. 112).

Memorandum Opinion filed Jul. 1, 2009, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 11 pages. (Dkt. No. 224).

Accenture's Reply to Guidewire's Amended Counterclaims with Defenses to Accenture's Second Amended Complaint filed Aug. 6, 2009, in lawsuit asserting U.S. Patent No, 7,013,284 B2, captioned *Accenture Global Services GmbH, et al. v. Guidewire Software, Inc.*, Case No. 07cv826, D. Del. Dec. 18, 2007. 14 pages. (Dkt. No. 259).

Joint Claim Construction Statement filed Sep. 29, 2009, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 7 pages. (Dkt. No. 294).

Joint Claim Construction Appendix vol. III of III Exhibits 3-4 filed Oct. 2, 2009, in lawsuit asserting U.S. Patent No. 7,013,284 B2, captioned *Accenture Global Services GmbH, et al. v. Guidewire Software, Inc.*, Dkt. No. 07cv826, D. Del. Dec. 18, 2007. 219 pages.

Accenture's Opening Claim Construction Brief filed Oct. 2, 2009, in lawsuit asserting U.S. Patent No, 7,013,284 B2, captioned *Accenture Global Services GmbH, et al. v. Guidewire Software, Inc.*, Case No. 07cv826, D. Del. Dec. 18, 2007. 31 pages. (Dkt. No. 303).

Declaration of Diana Luo in Support of Plaintiffs Accenture Global Services GmbH and Accenture LLP'S Opening Claim Construction Brief filed Oct. 5, 2009, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007, 5 pages. (Dkt. No. 305).

Guidewire's Answering Claim Construction Brief filed on Oct. 30, 2009, in lawsuit asserting U.S. Patent No. 7,013,284 B2, captioned *Accenture Global Services GmbH, et al. v. Guidewire Software, Inc.*, Case No. 07cv826, D. Del, Dec. 18, 2007. 49 pages. (Dkt. No. 316).

Declaration of Diana Luo in Support of Accenture's Claim Construction Answering Brief filed Nov. 5, 2009, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 8 pages. (Dkt. No. 322).

Redacted Accenture's Claim Construction Answering Brief filed Nov. 5, 2009, in lawsuit asserting U.S. Patent No, 7,013,284 B2, captioned *Accenture Global Services GmbH, et al. v. Guidewire Software, Inc.*, Case No. 07cv826, D. Del. Dec. 18, 2007. 25 pages. (Dkt. No. 321).

Redacted Defendant Guidewire's Opening Claim Construction Brief, filed Nov. 6, 2009, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 30 pages. (dKT. nO. 325).

Accenture's Responses to Interrogatory No. 14, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007.

Accenture's Responses to Interrogatory No. 16, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007.

Memorandum Order denying without Prejudice and to be re-filed after the Supreme Court issues its ruling in *Bilski* v. *Doll*, 129 S. Ct. 2735 (U.S. 2009), filed Feb. 26, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 3 pages.(Dkt. No. 478).

Memorandum Order regarding claim construction of the '284 patent and '111 patent, filed Mar. 5, 2010, filed in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 7 pages. (Dkt. No. 482).

Memorandum Opinion, filed Mar. 5, 2010, filed in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 43 pages. (Dkt. No. 483).

Opening Brief in Support re Motion for Summary Judgment (Partial) That the '284 Patent is Invalid as Indefinite, filed Dec. 16, 2009, in lawsuit asserting U.S. Patent No. 7,013,284 B2, captioned *Accenture Global Services GmbH, et al. v. Guidewire Software, Inc.*,Case No. 07cv826, D. Del. Dec. 18, 2007. 21 pages. (Dkt. No. 347).

Opening Brief in Support re Motion for Summary Judgment (Partial) That the '284 Patent is Invalid as Claiming Unpatentable Subject Matter, filed Dec. 16, 2009, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 15 pages.(Dkt. No. 349).

Redacted version of Opening Brief in Support of Motion for Summary Judgment (Partial) of Invalidity of '284 Patent because of an On-Sale Bar, filed Jan. 8, 2010, in lawsuit asserting U.S, Patent No. 7,013,284 B2, captioned *Accenture Global Services GmbH, et al. v. Guidewire Software, Inc.*, Case No. 07cv826, D. Del. Dec. 18, 2007. 31 pages. (Dkt. No. 392).

Redacted version of Opening Brief in Support of Motion for Summary Judgment(Partial) of Invalidity of '284 Patent because of an On-Sale Bar, filed Jan. 8, 2010, in lawsuit asserting U.S. Patent No. 7,013,284 B2, captioned *Accenture Global Servic, es GmbH, et al. v. Guidewire Software, Inc.*, Case No. 07cv, D. Del. Dec. 18, 2007. 75 pages. (Dkt. No. 393).

Redacted version of Opening Brief in Support of Motion for Summary Judgment (Partial) Regarding Statute of Limitations, filed Jan. 8, 2010, in lawsuit asserting U.S. Patent No. 7,013,284 B2, captioned

*Accenture Global Services GmbH*, et al. v. *Guidewire Software, Inc.*, Case No. 07cv826, D. Del. Dec. 18, 2007. 14 pages. (Dkt. No. 395).
Redacted Version of Opening Brief in Support, of Motion for Summary Judgment That the '284 Patent is Invalid as Anticipated or, in the Alternative, Obvious, filed Jan. 8, 2010, in lawsuit asserting U.S. Patent No. 7,013,284 B2, captioned *Accenture Global Services GmbH*, et al. v. *Guidewire Software, Inc.*, Case No. 07cv826, D. Del. Dec. 18, 2007. 46 pages. (Dkt. No. 396).
Answering Brief in Opposition re Motion for Summary Judgment (Partial) That the '284 Patent is Invalid as Anticipated or, in the Alternative, Obvious, filed Jan. 8, 2010, in lawsuit asserting U.S. Patent No. 7,013,284 B2, captioned *Accenture Global Services GmbH*, et al. v. *Guidewire Software, Inc.*, Case No. 07cv826, D. Del. Dec. 18, 2007. 23 pages. (Dkt. No. 397).
Redacted version of Appendix, vol. 1 of 12, filed Jan. 8, 2010, in lawsuit asserting U.S. Patent No. 7,013,284 B2, captioned *Accenture Global Services GmbH*, et al. v. *Guidewire Software, Inc.*, Case No. 07cv826, D. Del. Dec. 18, 2007. 202 pages.(Dkt. No. 398).
Redacted version of Appendix, (vol. 2 of 12—Exhibits 26-38), filed Jan. 8, 2010, in lawsuit asserting U.S. Patent No. 7,013,284 B2, captioned *Accenture Global Services GmbH*, et al. v. *Guidewire Software, Inc.*, Case No. 07cv826, D. Del. Dec. 18, 2007. 34 pages. (Dkt. No. 399).
Redacted version of Appendix, (vol. 3 of 12—Exhibits 39-58), filed Jan. 8, 2010, in lawsuit asserting U.S. Patent No. 7,013,284 B2, captioned *Accenture Global Services GmbH*, et al. v. *Guidewire Software, Inc.*, Case No. 07cv826, D. Del. Dec. 18, 2007. 44 pages. (Dkt. No. 400).
Redacted version of Appendix, (vol. 4 of 12—Exhibits 59-64), filed Jan. 8, 2010, in lawsuit asserting U.S. Patent No. 7,013,284 B2, captioned *Accenture Global Services GmbH*, et al. v. *Guidewire Software, Inc.*, Case No. 07cv826, D. Del. Dec. 18, 2007. 39 pages. (Dkt. No. 401).
Redacted version of Appendix, (vol. 5 of 12—Exhibits 65-99), filed Jan. 8, 2010, in lawsuit asserting U.S. Patent No, 7,013,284 B2, captioned *Accenture Global Services GmbH*, et al. v. *Guidewire Software, Inc.*, Case No. 07cv826, D. Del. Dec. 18, 2007. 190 pages. (Dkt. No. 404).
Redacted version of Appendix, (vol. 6 of 12—Exhibits 100-129), filed Jan. 8, 2010, in lawsuit asserting U.S. Patent No, 7,013,284 B2, captioned *Accenture Global Services GmbH*, et al. v. *Guidewire Software, Inc.*, Case No. 07cv826, D, Del. Dec. 18, 2007. 427 pages. (Dkt. No. 405).
Redacted version of Appendix, (vol. 7 of 12—Exhibits 130-154), filed Jan. 8, 2010, in lawsuit asserting U.S. Patent No. 7,013,284 B2, captioned *Accenture Global Services GmbH*, et al. v. *Guidewire Software, Inc.*, Case No. 07cv826, D. Del. Dec. 18, 2007. 467 pages. (Dkt. No. 406).
Redacted version of Appendix, (vol. 8 of 12—Exhibits 155-161), filed Jan. 8, 2010, in lawsuit asserting U.S. Patent No. 7,013,284 B2, captioned *Accenture Global Services GmbH*, et al. v. *Guidewire Software, Inc.*, Case No. 07cv826, D. Del. Dec. 18, 2007. 330 pages. (Dkt. No. 407).
Redacted version of Appendix, (vol. 9 of 12—Exhibits 162-164), filed Jan. 8, 2010, in lawsuit asserting U.S. Patent No. 7,013,284 B2, captioned *Accenture Global Services GmbH*, et al. v. *Guidewire Software, Inc.*, Case No. 07cv826, D. Del. Dec. 18, 2007, 13 pages. (Dkt. No. 408).
Redacted version of Appendix, (vol. 10 of 12—Exhibits 165-170), filed Jan. 8, 2010, in lawsuit asserting U.S. Patent No, 7,013,284 B2, *Captioned Accenture Global Services GmbH*, et al, v. *Guidewire Software*, Inc., Case No. 07cv826, D. Del. Dec. 18, 2007. 18 pages. (Dkt. No. 409).
Redacted version of Appendix, (vol. 11 of 12—Exhibit 171), filed Jan. 8, 2010, in lawsuit asserting U.S. Patent No. 7,013,284 B2, *Captioned Accenture Global Services GmbH*, et al, v. *Guidewire Software*, Inc., Case No. 07cv826, D. Del. Dec. 18, 2007. 13 pages. (Dkt. No. 410).
Redacted version of Appendix, (vol. 12 of 12—Exhibits 172-183), filed Jan. 8, 2010, in lawsuit asserting U.S. Patent No. 7,013,284 B2, *Captioned Accenture Global Services GmbH*, et al. v. *Guidewire Software*, Inc., Case No. 07cv826, D. Del. Dec. 18, 2007. 80 pages. (Dkt. No. 412).

Redacted version of Appendix, Corrected vol. 12 (Exhibits 172-183), filed Jan. 8, 2010, in lawsuit asserting U.S. Patent No. 7,013,284 B2, *Captioned Accenture Global Services GmbH*, et al. v. *Guidewire Software*, Inc., Case No. 07cv826, D. Del. Dec. 18, 2007. 80 pages. (Dkt. No. 413).
Redacted version of Declaration of W. Michael Flaharty in Support of Plaintiffs Briefs in Opposition to Defendants' Motions for Summary Judgment, filed Jan. 20, 2010, in lawsuit asserting U.S. Patent No. 7,013,284 B2, *Captioned Accenture Global Services GmbH*, et al. v. *Guidewire Software*, Inc., Case No. 07cv826, D. Del. Dec. 18, 2007. 6 pages. (Dkt. No. 432).
Redacted version of Declaration of Diana Luo in Support of Plaintiffs Briefs in Opposition to Defendants' Motions for Partial Summary Judgment, filed Jan. 20, 2010, in lawsuit asserting U.S. Patent No. 7,013,284 B2, *Captioned Accenture Global Services GmbH*, et al, v. *Guidewire Software*, Inc., Case No. 07cv826, D. Del. Dec. 18, 2007. 68 pages. (Dkt. No. 433).
Redacted Version of Answering Brief in Opposition to Defendant's Motion for Partial Summary Judgment of Invalidity for Indefiniteness of the '284 Patent, filed Jan. 20, 2010, in lawsuit asserting U.S. Patent No. 7,013,284 B2, *Captioned Accenture Global Services GmbH*, et al. v. *Guidewire Software*, Inc., Case No. 07cv826, D. Del. Dec. 18, 2007. 22 pages. (Dkt. No. 435).
Redacted Version of Declaration of Michael Ian Shamos in Support of Plaintiffs' Brief in Opposition to Defendants Motion for Partial Summary Judgment, filed Jan. 20, 2010, in lawsuit asserting U.S. Patent No, 7,013,284 B2, *Captioned Accenture Global Services GmbH*, et al. v. *Guidewire Software*, Inc., Docket No. 07cv826, D. Del. Dec. 18, 2007. 6 pages. (Dkt. No. 436).
Redacted version of Answering Brief in Opposition to Defendant's Motion for Partial Summary Judgment of Invalidity of the '284 Patent as Anticipated or, in the alternative, Obvious, filed Jan. 20, 2010, in lawsuit asserting U.S. Patent No. 7,013,284 B2, *Captioned Accenture Global Services GmbH*, et al. v. *Guidewire Software*, Inc., Case No. 07cv826, D. Del. Dec. 18, 2007. 36 pages. (Dkt. No. 437).
Redacted version of Answering Brief in Opposition to Defendant's Motion for Partial Summary Judgment of Invalidity of '284 Patent Because of an On-Sale Bar, filed Jan. 20, 2010, in lawsuit asserting U.S. Patent No. 7,013,284 B2, *Captioned Accenture Global Services GmbH*, et al. v. *Guidewire Software*, Inc., Case No. 07cv826, D. Del. Dec. 18, 2007. 51 pages. (Dkt. No. 442).
Redacted version of Declaration of Ruchika Agrawal in Support of Accenture's Opposition to Defendant's Motion for Partial Summary Judgment of Invalidity of '284 Patent because of an On-Sale Bar, filed Jan. 20, 2010, in lawsuit asserting U.S. Patent No. 7,013,284 B2, *Captioned Accenture Global Services GmbH*, et al. v. *Guidewire Software*, Inc., Case No. 07cv826, D. Del. Dec. 18, 2007. 33 pages. (Dkt. No. 443).
Redacted version of Declaration of Michael Ian Shamos in Support of Accenture's Opposition to Defendant's Motion for Partial Summary Judgment of Invalidity of '284 Patent because of an On-Sale Bar, filed Jan. 20, 2010, in lawsuit asserting U.S. Patent No. 7,013,284 B2, *Captioned Accenture Global Services GmbH*, et al. v. *Guidewire Software*, Inc., Case No. 07cv826, D, Del. Dec. 18, 2007. 26 pages. (Dkt. No. 444).
Redacted version of Declaration of George Victor Guyan in Support of Accenture's Opposition to Defendant's Motion for Partial Summary Judgment of Invalidity of '284 Patent because of an On-Sale Bar, filed Jan. 20, 2010, in lawsuit asserting U.S. Patent No. 7,013,284 B2, *Captioned Accenture Global Services GmbH*, et al. v. *Guidewire Software*, Inc., Case No. 07cv826, D. Del. Dec. 18, 2007. 7 pages. (Dkt. No. 445).
Redacted version of Declaration of Jeffrey Wargin in Support of Accenture's Opposition to Defendant's Motion for Partial Summary Judgment of Invalidity of '284 Patent because of an On-Sale Bar, filed Jan. 20, 2010, in lawsuit asserting U.S. Patent No. 7,013,284 B2, *Captioned Accenture Global Services GmbH*, et al. v. *Guidewire Software*, Inc., Case No. 07cv826, D. Del. Dec. 18, 2007. 8 pages. (Dkt. No. 446).
Redacted version of Reply Brief re Motion for Summary Judgment (Partial) of Invalidity of '284 Patent because of an On-Sale Bar, filed Feb. 2, 2010, in lawsuit asserting U.S, Patent No. 7,013,284 B2,

*Captioned Accenture Global Services GmbH*, et al. v. *Guidewire Software*, Inc., Case No. 07cv826, D. Del. Dec. 18, 2007. 8 pages. (Dkt. No. 454).
Redacted version of Reply Brief re Motion for Summary Judgment (Partial) That the '284 Patent is Invalid as Indefinite, filed Feb. 2, 2010, in lawsuit asserting U.S. Patent No. 7,013,284 B2, *Captioned Accenture Global Services GmbH*, et al. v. *Guidewire Software*, Inc., Case No. 07cv826, D. Del. Dec. 18, 2007. 18 pages. (Dkt. No. 455).
Redacted version of Reply Brief re Motion for Summary Judgment (Partial) that the '284 Patent is Invalid as claiming Unpatentable Subject Matter, filed Feb. 2, 2010, filed in lawsuit asserting U.S. Patent No. 7,013,284 B2, *Captioned Accenture Global Services GmbH*, et al. v. *Guidewire Software*, Inc., Case No. 07cv826, D. Del. Dec. 18, 2007. 14 pages. (Dkt. No. 456).
Redacted version of Reply Brief re Motion for Summary Judgment that the '284 is Invalid as Anticipated or , in the Alternative, Obvious, filed Feb. 2, 2010, filed in lawsuit asserting U.S. Patent No, 7,013,284 B2, *Captioned Accenture Global Services GmbH*, et al. v. *Guidewire Software*, Inc., Case No. 07cv826, D. Del. Dec. 18, 2007. 13 pages. (Dkt. No. 458).
Order denying Motion for Summary Judgment (Partial) denying Motion for Summary Judgment, denying Motion for Summary Judgment, denying Motion to Strike, denying Motion for Summary Judgment, denying Motion for Summary Judgment, re Memorandum Opinion, filed Mar. 5, 2010, filed in lawsuit asserting U.S. Patent No. 7,013,284 B2, *Captioned Accenture Global Services GmbH*, et al. v. *Guidewire Software*, Inc., Case No. 07cv826, D. Del. Dec. 18, 2007. 2 pages. (Dkt. No. 484).
Complaint for Patent Infringement filed Nov. 10, 2009, in lawsuit asserting U.S. Patent No. 7,617,240, Captioned *Accenture Global Services GmbH*, et al. v. *Guidewire Software*, Inc., Dkt. No. 09cv848, D. Del. Nov. 10, 2009. 6 pages.
Defendant Guidewire's Answer and Counterclaims to Accenture's Complaint for Patent Infringement filed Nov. 30, 2009, in lawsuit asserting U.S. Patent No. 7,617,240, Captioned *Accenture Global Services GmbH*, et al. v. *Guidewire Software*, Inc., Dkt. No. 09cv848, D. Del. Nov. 10, 2009, 9 pages.
Office Action, mailed Feb. 26, 2001, for commonly owned U.S. Appl. No. 09/305,228, 7 pages.
Aug. 27, 2001 Response to Office Action mailed Feb. 26, 2001, for commonly owned U.S. Appl. No. 09/305,228. 9 pages.
Office Action, mailed Oct. 18, 2001, for commonly owned U.S. Appl. No. 09/305,228. 12 pages.
Jan. 18, 2002 Response to Office Action, mailed Oct. 18, 2001, for commonly owned U.S. Appl. No. 09/305,228. 6 pages.
Mar. 11, 2002 Amendment after Office Action mailed Oct. 18, 2001, for commonly owned U.S. Appl. No. 09/305,228 filed May 4, 1999. 16 pages.
Office Action, mailed Mar. 1, 2002, for commonly owned U.S. Appl. No. 09/305,228. 3 pages.
Office Action, mailed Apr. 9, 2002, for commonly owned U.S. Appl. No. 09/305,228. 3 pages.
Continued Prosecution Application (CPA) Request dated Apr. 18, 2002, for commonly owned U.S. Appl. No. 09/305,228, filed May 4, 1999. 2 pages.
Jul. 1, 2002 Response to Office Action, mailed Mar. 1, 2002, for commonly owned U.S. Appl. No. 09/305,228. 9 pages.
Office Action, mailed Sep. 11, 2002, for commonly owned U.S. Appl. No. 09/305,228. 10 pages.
Mar. 11, 2003 Response to Office Action mailed Sep. 11, 2002, for commonly owned U.S. Appl. No. 09/305,228. 14 pages.
Office Action, mailed Jun. 4, 2003, for commonly owned U.S. Appl. No. 09/305,228. 12 pages.
Oct. 6, 2003 Response to Office Action mailed Jun. 4, 2003, for commonly owned U.S. Appl. No. 09/305,228. 7 pages.
Request for Continued Examination dated Oct. 6, 2003, for commonly owned U.S. Appl. No. 09/305,228, filed May 4, 1999. 2 pages.
Office Action, mailed Oct. 22, 2003, for commonly owned U.S. Appl. No. 09/305,228. 11 pages.
Feb. 20, 2004 Response to Office Action mailed Oct. 22, 2003, for commonly owned U.S. Appl. No. 09/305,228. 8 pages.
Office Action, mailed May 13, 2004, for commonly owned U.S. Appl. No. 09/305,228. 12 pages.
Office Action, mailed Nov. 16, 2004, for commonly owned U.S. Appl. No. 09/305,228. 3 pages.
Office Action, mailed Mar. 21, 2001, for commonly owned U.S. Appl. No. 09/305,816. 11 pages.
Sep. 21, 2001 Response to Office Action, mailed Mar. 21, 2001, for commonly owned U.S. Appl. No. 09/305,816. 4 pages.
Office Action, mailed Nov. 23, 2001 for commonly owned U.S. Appl. No. 09/305,816. 10 pages.
Apr. 19, 2002 Response to Office Action, mailed Nov. 23, 2001 for commonly owned U.S. Appl. No. 09/305,816. 7 pages.
Office Action, Notice of Allowability, mailed May 3, 2002 for commonly owned U.S. Appl. No. 09/305,816. 9 pages.
Office Action, mailed Aug. 13, 2001, for commonly owned U.S. Appl. No. 09/305,817. 8 pages.
Feb. 12, 2002 Response to Office Action, mailed Aug. 13, 2001, for commonly owned U.S. Appl. No. 09/305,817.14 pages.
Office Action, mailed Mar. 22, 2002, for commonly owned U.S. Appl. No. 09/305,817. 11 pages.
Preliminary Amendment and Continued Prosecution Application mailed Aug. 22, 2002, for commonly owned U.S. Appl. No. 09/305,817, filed May 4, 1999. 4 pages.
Oct. 9, 2002 Response to Office Action, mailed Mar. 22, 2002, for commonly owned U.S. Appl. No. 09/305,817. 14 pages.
Office Action, mailed Dec. 20, 2002, for commonly owned U.S. Appl. No. 09/305,817. 17 pages.
Jun. 20, 2003 Response to Office Action, mailed Dec. 20, 2002, for commonly owned U.S. Appl. No. 09/305,817. 23 pages.
Office Action, mailed Jul. 22, 2003, for commonly owned U.S. Appl. No. 09/305,817. 16 pages.
Office Action, mailed Apr. 6, 2004, for commonly owned U.S. Appl. No. 09/305,817. 2 pages.
Office Action, mailed Mar. 14, 2001, for commonly owned U.S. Appl. No. 09/305,331. 11 pages.
Sep. 14, 2001 Response to Office Action, mailed Mar. 14, 2001, for commonly owned U.S. Appl. No. 09/305,331. 10 pages.
Office Action, mailed Dec. 3, 2001, for commonly owned U.S. Appl. No. 09/305,331. 10 pages.
May 31, 2002 Amendment and Request for Reconsideration after Office Action mailed Dec. 3, 2001, for commonly owned U.S. Appl. No. 09/305,331.12 pages.
Office Action, mailed Aug. 14, 2002, for commonly owned U.S. Appl. No. 09/305,331. 15 pages.
Nov. 14, 2002 Response to Office Action mailed Aug. 14, 2002, for commonly owned U.S. Appl. No. 09/305,331. 13 pages.
Office Action, mailed Dec. 20, 2002, for commonly owned U.S. Appl. No. 09/305,331. 14 pages.
Feb. 20, 2003 Response to Office Action, mailed Dec. 20, 2002, for commonly owned U.S. Appl. No. 09/305,331. 7 pages.
Office Action, mailed Mar. 4, 2003, for commonly owned U.S. Appl. No. 09/305,331.3 pages.
Request for continued Examination dated Apr. 28, 2003, for commonly owned U.S. Appl. No. 09/305,331, filed May 4, 1999. 2 pages.
Office Action, mailed Jun. 30, 2003, for commonly owned U.S. Appl. No. 09/305,331. 15 pages.
Sep. 22, 2003 Response to Office Action, mailed Jun. 30, 2003, for commonly owned U.S. Appl. No. 09/305,331. 6 pages.
Office Action, mailed Dec. 3, 2003, for commonly owned U.S. Appl. No. 09/305,331. 2 pages.
Jan. 5, 2004 Response to Office Action, mailed Dec. 3, 2003, for commonly owned U.S. Appl. No. 09/305,331. 8 pages.
Feb. 2, 2004 Response to Office Action, mailed Dec. 3, 2003, for commonly owned U.S. Appl. No. 09/305,331. 8 pages.
Notice of Allowability mailed Oct. 27, 2004, for commonly owned U.S. Appl. No. 09/305,331, filed May 4, 1999. 9 pages.
Second Request for Ex Parte Reexamination, including exhibits I,J,K,L,M,N,O,P, and Q, dated Oct. 9, 2009, for commonly owned U.S. Appl. No. 09/305,331 and later assigned U.S. Appl. No. 90/010,713, 974 pages.
Order Granting Ex Parte Reeexamination mailed Dec. 17, 2009, for commonly owned U.S. Appl. No. 09/305,331 and later assigned U.S. Appl. No. 90/010,713. 15 pages.
U.S. Office Action mailed May 9, 2001, for commonly owned U.S. Appl. No. 09/305,234, filed May 4, 1999. 5 pages.

Nov. 27, 2001 Response to Office Action dated May 9, 2001, for commonly owned U.S. Appl. No. 09/305,234, filed May 4, 1999. 9 pages.
U.S. Office Action mailed Feb. 7, 2002, for commonly owned U.S. Appl. No. 09/305,234 filed May 4, 1999. 4 pages.
Mar. 6, 2002 Response to Office Action dated Feb. 7, 2002, for commonly owned U.S. Appl. No. 09/305,234 filed May 4, 1999. 2 pages.
U.S. Office Action dated Jun. 3, 2002, for commonly owned U.S. Appl. No. 09/305,234 filed May 4, 1999. 6 pages.
Sep. 3, 2002 Amendment in Response to Office Action dated Jun. 3, 2002, for commonly owned U.S. Appl. No. 09/305,234 filed May 4, 1999. 5 pages.
Advisory Action mailed Sep. 17, 2002, for commonly owned U.S. Appl. No. 09/305,234 filed May 4, 1999. 3 pages.
Filing of Continued Prosecution Application dated Nov. 4, 2002, for commonly owned U.S. Appl. No. 09/305,234 filed May 4, 1999. 2 pages. 2 pages.
U.S. Office Action mailed Nov. 26, 2002, for commonly owned U.S. Appl. No. 09/305,234 filed May 4, 1999. 4 pages.
Mar. 4, 2003 Response to Office Action dated Nov. 26, 2002, for commonly owned U.S. Appl. No. 09/305,234 filed May 4, 1999. 13 pages.
U.S. Office Action mailed May 21, 2003, for commonly owned U.S. Appl. No. 09/305,234 filed May 4, 1999. 6 pages.
Sep. 22, 2003 Amendment in Response to Office Action mailed May 21, 2003, for commonly owned U.S. Appl. No. 09/305,234 filed May 4, 1999. 10 pages.
Request for Continued Examination dated Oct. 21, 2003, for commonly owned U.S. Appl. No. 09/305,234, filed May 4, 1999. 2 pages. 2 pages.
Advisory Action mailed Oct. 28, 2003, for commonly owned U.S. Appl. No. 09/305,234, filed May 4, 1999. 2 pages. 2 pages.
U.S. Office Action mailed Nov. 17, 2003 for commonly owned U.S. Appl. No. 09/305,234, filed May 4, 1999. 5 pages.
Feb. 17, 2004 Response to Office Action mailed Nov. 17, 2003, for commonly owned U.S. Appl. No. 09/305,234, filed May 4, 1999. 11 pages.
U.S. Office Action mailed May 4, 2004, for commonly owned U.S. Appl. No. 09/305,234, filed May 4, 1999. 4 pages.
Jul. 6, 2004 Amendment in Response to Office Action mailed May 4, 2004, for commonly owned U.S. Appl. No. 09/305,234, filed May 4, 1999. 9 pages.
Advisory Action mailed Aug. 31, 2004, for commonly owned U.S. Appl. No. 09/305,234, filed May 4, 1999. 3 pages.
Request for Continued Examination and Amendment dated Sep. 7, 2004, for commonly owned U.S. Appl. No. 09/305,234, filed May 4, 1999. 10 pages.
Advisory Action mailed Sep. 14, 2004, for commonly owned U.S. Appl. No. 09/305,234, filed May 4, 1999. 3 pages.
U.S. Office Action mailed Nov. 3, 2004, for commonly owned U.S. Appl. No. 09/305,234, filed May 4, 1999. 6 pages.
May 5, 2005 Amendment and Response to Office Action mailed Nov. 3, 2004, for commonly owned U.S. Appl. No. 09/305,234, filed May 4, 1999, 13 pages.
Notice of Informal or Non-Responsive Amendment mailed Jul. 26, 2005, for commonly owned U.S. Appl. No. 09/305,234, filed May 4, 1999. 2 pages.
Aug. 24, 2005 Response to Office Action mailed Jul. 26, 2005, for commonly owned U.S. Appl. No. 09/305,234, filed May 4, 1999. 8 pages.
U.S. Office Action mailed Nov. 17, 2005, for commonly owned U.S. Appl. No. 09/305,234, filed May 4, 1999. 6 pages.
Jan. 17, 2006 Amendment after Final Rejection dated Nov. 17, 2005, for commonly owned U.S. Appl. No. 09/305,234, filed May 4, 1999. 14 pages.
Advisory Action mailed Feb. 9, 2006, for commonly owned U.S. Appl. No. 09/305,234, filed May 4, 1999. 3 pages.
Mar. 29, 2006 Second Response to Office Action dated Nov. 17, 2005, for commonly owned U.S. Appl. No. 09/305,234, filed May 4, 1999. 12 pages.
Examiner Interview Summary mailed Mar. 30, 2006, for commonly owned U.S. Appl. No. 09/305,234, filed May 4, 1999, 4 pages.

Ex Parte Quayle Action mailed Apr. 12, 2006, for commonly owned U.S. Appl. No. 09/305,234, filed May 4, 1999. 4 pages.
May 18, 2006 Amendment and Response to Ex Parte Quayle Action mailed Apr. 12, 2006, for commonly owned U.S. Appl. No. 09/305,234 filed May 4, 1999. 5 pages.
Notice of Informal or Non-Responsive Amendment mailed Jun. 1, 2006, for commonly owned U.S. Appl. No. 09/305,234 filed May 4, 1999. 2 pages.
Jun. 16, 2006 Response to Notice of Non-Compliant Amendment dated Jun. 1, 2006, for commonly owned U.S. Appl. No. 09/305,234, filed May 4, 1999. 4 pages.
Ex Parte Quayle mailed May 18, 2007, for commonly owned U.S. Appl. No. 09/305,234 filed May 4, 1999. 3 pages.
Jun. 25, 2007 Response to Ex Parte Quayle dated May 18, 2007, for commonly owned U.S. Appl. No. 09/305,234 filed May 4, 1999. 10 pages.
Notice of Allowance and Fees Due, mailed Jan. 10, 2008, for commonly owned U.S. Appl. No. 09/305,234. 4 pages.
Apr. 10, 2008 Request for Continued Examination, for commonly owned U.S. Appl. No. 09/305,234, filed May 4, 1999, 2 pages.
Notice of Allowance mailed Apr. 30, 2008, for commonly owned U.S. Appl. No. 09/305,234, filed May 4, 1999, 4 pages.
Issue Notification dated Jun. 25, 2008, for commonly owned U.S. Appl. No. 09/305,234, filed May 4, 1999. 1 page.
Jul. 3, 2008 Request for Continued Examination, for commonly owned U.S. Appl. No. 09/305,234, filed May 4, 1999. 2 pages.
Notice of Withdrawal from Issue mailed Jul. 8, 2008, for commonly owned U.S. Appl. No. 09/305,234, filed May 4, 1999. 1 page.
U.S. Office Action mailed Aug. 1, 2008, for commonly owned U.S. Appl. No. 09/305,234, filed May 4, 1999. 6 pages.
Examiner Interview Summary mailed Oct. 27, 2008, for commonly owned U.S. Appl. No. 09/305,234, filed May 4, 1999. 2 pages.
Dec. 1, 2008 Response to the Non-Final Office Action mailed Aug. 1, 2008, for commonly owned U.S. Appl. No. 09/305,234, filed May 4, 1999. Dated Dec. 1, 2008. 22 pages.
Examiner's Amendment mailed Aug. 12, 2009, for commonly owned U.S. Appl. No. 09/305,234, filed May 4, 1999. 7 pages.
Notice of Allowance mailed Sep. 3, 2009, for commonly owned U.S. Appl. No. 09/305,234, filed May 4, 1999. 10 pages.
Request for Ex Parte Reexamination, including exhibits H,I,J, and K, dated Nov. 10, 2009, for commonly owned U.S. Appl. No. 09/305,234, filed May 4, 1999 and later assigned U.S. Appl. No. 90/010,735. 831 pages.
Dec. 16, 2009 Report on the Filing or Determination of an Action Regarding a Patent or Trademark, for commonly owned U.S. Appl. No. 09/305,234, filed May 4, 1999. 1 page.
Order Granting Ex Parte Reeexamination mailed Jan. 7, 2010, for commonly owned U.S. Appl. No. 09/305,234, filed May 4, 1999 and later assigned U.S. Appl. No. 90/010,735. 17 pages.
U.S. Office Action mailed Mar. 9, 2001, for commonly owned U.S. Appl. No. 09/305,146, filed May 4, 1999. 6 pages.
Sep. 10, 2001 Amendment and Response to Office Action mailed Mar. 9, 2001, for commonly owned U.S. Appl. No. 09/305,146, filed May 4, 1999. 7 pages.
U.S. Office Action mailed Dec. 4, 2001, for commonly owned U.S. Appl. No. 09/305,146, filed May 4, 1999. 7 pages.
Preliminary Amendment dated Apr. 19, 2002, for commonly owned U.S. Appl. No. 09/305,146, filed May 4, 1999. 12 pages.
Continuing Prosecution Application (ACPA) dated Apr. 19, 2002, for commonly owned U.S. Appl. No. 09/305,146, filed May 4, 1999. 2 pages.
U.S. Office Action mailed May 6, 2002, for commonly owned U.S. Appl. No. 09/305,146, filed May 4, 1999. 6 pages.
Amendment dated Jul. 3, 2002, for commonly owned U.S. Appl. No. 09/305,146, filed May 4, 1999. 10 pages.
Advisory Action mailed Jul. 23, 2002, for commonly owned U.S. Appl. No. 09/305,146, filed May 4, 1999. 3 pages.
Request for Continued Examination and Amendment dated Oct. 7, 2002, for commonly owned U.S. Appl. No. 09/305,146, filed May 4, 1999. 14 pages.
Jan. 9, 2003 Supplemental Response and Request for Continued Examination, for commonly owned U.S. Appl. No. 09/305,146, filed May 4, 1999. 14 pages.

Jan. 17, 2003 Request for Corrected RCE Filing, for commonly owned U.S. Appl. No. 09/305,146, filed May 4, 1999. 5 pages.
U.S. Office Action mailed Mar. 18, 2003, for commonly owned U.S. Appl. No. 09/305,146, filed May 4, 1999. 6 pages.
Amendment dated Jun. 17, 2003, for commonly owned U.S. Appl. No. 09/305,146, filed May 4, 1999. 7 pages.
U.S. Office Action mailed Nov. 13, 2003, for commonly owned U.S. Appl. No. 09/305,146, filed May 4, 1999. 6 pages.
Proposed Amendment for RCE for personal Interview on Feb. 3, 2004 dated Jan. 29, 2004, for commonly owned U.S. Appl. No. 09/305,146, filed May 4, 1999. 8 pages.
Interview Summary dated Feb. 3, 2004, for commonly owned U.S. Appl. No. 09/305,146, filed May 4, 1999. 2 pages.
Amendment dated Feb. 13, 2004, for U.S. Appl. No. 09/305,146, filed May 4, 1999. 7 pages.
Request for Continued Examination dated Feb. 13, 2004, for commonly owned U.S. Appl. No. 09/305,146, filed May 4, 1999. 2 pages.
U.S. Office Action mailed May 20, 2004, for commonly owned U.S. Appl. No. 09/305,146, filed May 4, 1999. 6 pages.
Amendment dated Aug. 20, 2004, for commonly owned U.S. Appl. No. 09/305,146, filed May 4, 1999. 11 pages.
U.S. Office Action mailed Jan. 21, 2005, for commonly owned U.S. Appl. No. 09/305,146, filed May 4, 1999. 7 pages.
Mar. 21, 2005 Amendment and Response to Office Action mailed Jan. 21, 2005, for commonly owned U.S. Appl. No. 09/305,146, filed May 4, 1999. 11 pages.
Advisory Action mailed Apr. 28, 2005, for commonly owned U.S. Appl. No. 09/305,146, filed May 4, 1999. 3 pages.
Request for Continued Examination dated May 31, 2005, for commonly owned U.S. Appl. No. 09/305,146, filed May 4, 1999. 2 pages.
Amendment dated May 31, 2005, for commonly owned U.S. Appl. No. 09/305,146, filed May 4, 1999. 11 pages.
U.S. Office Action mailed Aug. 23, 2005, for commonly owned U.S. Appl. No. 09/305,146, filed May 4, 1999. 5 pages.
Amendment dated Nov. 22, 2005, for commonly owned U.S. Appl. No. 09/305,146, filed May 4, 1999. 14 pages.
U.S. Office Action mailed Feb. 24, 2006, for commonly owned U.S. Appl. No. 09/305,146, filed May 4, 1999. 7 pages.
Pre-Appeal Brief Request for Review dated Apr. 24, 2006, for commonly owned U.S. Appl. No. 09/305,146, filed May 4, 1999. 5 pages.
Notice of Appeal dated Apr. 24, 2006, for commonly owned U.S. Appl. No. 09/305,146, filed May 4, 1999. 1 page.
Appeal Brief dated Jul. 24, 2006, for commonly owned U.S. Appl. No. 09/305,146, filed May 4, 1999. 28 pages.
Notification of Non-Compliant Appeal Brief mailed Oct. 13, 2006, for commonly owned U.S. Appl. No. 09/305,146, filed May 4, 1999. 2 pages.
Response to Notification of Non-Compliant Appeal Brief dated Nov. 13, 2006, for commonly owned U.S. Appl. No. 09/305,146, filed May 4, 1999. 2 pages.
Amended Appeal Brief dated Nov. 13, 2006, for commonly owned U.S. Appl. No. 09/305,146, filed May 4, 1999. 30 pages.
Notification of Non-Compliant Appeal Brief mailed Mar. 9, 2007, for commonly owned U.S. Appl. No. 09/305,146, filed May 4, 1999. 2 pages.
Response to Notification of Non-Compliant Appeal Brief dated Mar. 28, 2007, for commonly owned U.S. Appl. No. 09/305,146, filed May 4, 1999. 7 pages.
Examiner's Answer mailed Jul. 30, 2007, for commonly owned U.S. Appl. No. 09/305,146, filed May 4, 1999. 11 pages.
Reply Brief dated Oct. 1, 2007, for commonly owned U.S. Appl. No. 09/305,146, filed May 4, 1999. 12 pages.
Reply Brief noted by Examiner mailed Dec. 17, 2007, for commonly owned U.S. Appl. No. 09/305,146, filed May 4, 1999. 3 pages.
Decision of the Board of Patent Appeals and Interferences mailed Jun. 9, 2009, for commonly owned U.S. Appl. No. 09/305,146, 14 pages.
Notice of Allowance mailed Sep. 2, 2009, for commonly owned U.S. Appl. No. 09/305,146, filed May 4, 1999. 5 pages.
Request for Continued Examination dated Sep. 3, 2009, for commonly owned U.S. Appl. No. 09/305,146, filed May 4, 1999. 4 pages.
Notice of Allowance mailed Nov. 3, 2009, for commonly owned U.S. Appl. No. 09/305,146, filed May 4, 1999. 4 pages.
Request for Continued Examination dated Feb. 2, 2010, for commonly owned U.S. Appl. No. 09/305,146, filed May 4, 1999. 2 pages.
Notice of Allowance mailed Apr. 2, 2010, for commonly owned U.S. Appl. No. 09/305,146, filed May 4, 1999. 4 pages.
Request for Continued Examination dated Jul. 1, 2010, for commonly owned U.S. Appl. No. 09/305,146, filed May 4, 1999. 2 pages.
Notice of Allowance mailed Jul. 15, 2010, for commonly owned U.S. Appl. No. 09/305,146, filed May 4, 1999. 4 pages.
Preliminary Amendment filed Dec. 20, 2004, for commonly owned U.S. Appl. No. 11/017,086, filed Dec. 20, 2004. 9 pages.
U,S. Office Action mailed Sep. 23, 2005, for commonly owned U.S. Appl. No. 11/017,086, filed Dec. 20, 2004. 22 pages.
Jan. 23, 2006 Response to Office Action dated Sep. 23, 2005, for commonly owned U.S. Appl. No. 11/017,086, filed Dec. 20, 2004. 19 pages.
U.S. Office Action mailed Apr. 18, 2006, for commonly owned U.S. Appl. No. 11/017,086, filed Dec. 20, 2004. 24 pages.
Notice of Appeal filed Sep. 15, 2006, for commonly owned U.S. Appl. No. 11/017,086, filed Dec. 20, 2004. 1 page.
Feb. 14, 2007 Amendment and Request for Continued Examination, for commonly owned U.S. Appl. No. 11/017,086, filed Dec. 20, 2004. 18 pages.
U.S. Office Action mailed Mar. 22, 2007, for commonly owned U.S. Appl. No. 11/017,086, filed Dec. 20, 2004. 21 pages.
Aug. 17, 2007 Response to U.S. Office Action dated Mar. 22, 2007, for commonly owned U.S. Appl. No. 11/017,086, filed Dec. 20, 2004, 16 pages.
Office Action, mailed Nov. 5, 2007, for commonly owned U.S. Appl. No. 11/017,086. 23 pages.
Request for Continued Examination dated May 2, 2008, for commonly owned U.S. Appl. No. 11/017,086, filed Dec. 20, 2004. 2 pages.
Office Action mailed Aug. 11, 2008, for commonly owned U.S. Appl. No. 11/017,086, filed Dec. 20, 2004. 23 pages.
Jan. 8, 2009 Response to the final Office Action of Aug. 11, 2008, for commonly owned U.S. Appl. No. 11/017,086, filed Dec. 20, 2004. 17 pages.
Advisory Action mailed Feb. 2, 2009, for commonly owned U.S. Appl. No. 11/017,086, filed Dec. 20, 2004. 2 pages.
Request for Continued Examination dated Feb. 10, 2009, for commonly owned U.S. Appl. No. 11/017,086, filed Dec. 20, 2004. 2 pages.
U.S. Office Action mailed Mar. 3, 2009, for commonly owned U.S. Appl. No. 11/017,086, filed Dec. 20, 2004. 26 pages.
USPTO Communication mailed Mar. 12, 2009, for commonly owned U.S. Appl. No. 11/017,086, filed Dec. 20, 2004. 2 pages.
U.S. Office Action mailed Jul. 21, 2009, for commonly owned U.S. Appl. No. 11/017,086, filed Dec. 20, 2004. 25 pages.
Notice of Abandonment mailed Mar. 24, 2010, for commonly owned U.S. Appl. No. 11/017,086, filed Dec. 20, 2004. 3 pages.
U.S. Patent 7,013,284 Re-Examination Request U.S. Appl. No. 90/010,201, filed Jun. 19, 2008. 128 pages.
Determination of Reexam mailed Aug. 1, 2008, for commonly owned U.S. Reexamination No. 90/010,201, filed Jun. 19, 2008. 12 pages.
U.S. Office Action mailed Jul. 17, 2009, for commonly owned U.S. Reexamination No. 90/010,201, filed Jun. 19, 2008. 28 pages.
Sep. 17, 2009 Response to Office Action mailed Jul. 17, 2009, for commonly owned U.S. Reexamination No. 90/010,201, filed Jun. 19, 2008. 49 pages.
Examiner Interview Summary Report dated Sep. 17, 2009, for commonly owned U.S. Reexamination No. 90/010,201, filed Jun. 19, 2008. 3 pages.
Sep. 17, 2009 Affidavits, Declarations, and/or Exhibits filed, for commonly owned U.S. Reexamination No. 90/010,201, filed Jun. 19, 2008. 201 pages.
Decision Merging Proceedings Granted, mailed Feb. 26, 2010, for commonly owned U.S. Reexamination No. 90/010,201 filed Jun. 19, 2008. 3 pages.
Mar. 26, 2010 Amendment and Response to Office Action dated Feb. 26, 2010, for commonly owned U.S. Reexamination No. 90/010,201 filed Jun. 19, 2008. 11 pages.

Decision Merging Proceedings Granted, mailed Feb. 26, 2010, for commonly owned U.S. Reexamination No. 90/010,713 filed Oct. 9, 2009. 3 pages.
Mar. 26, 2010 Amendment and Response to Office Action dated Feb. 26, 2010, for commonly owned U.S. Reexamination No. 90/010,713 filed Oct. 9, 2009. 11 pages.
Examiner Interview Summary Record dated Jul. 13, 2010, for merged Reexamination Nos. 90/010,201 and 90/010,713 regarding commonly owned U.S. Patent No. 7,013,284 (41 pages).
Patent Owner's Statement of the Interview Under 37 C.F.R. 1.560(b) dated Jul. 30, 2010 for merged Reexamination Nos. 90/010,201 and 90/010,713 regarding commonly owned U.S. Patent No. 7,013,284. (17 pages).
Supplemental Response dated Aug. 27, 2010, for merged Reexamination Nos. 90/010,201 and 90/010,713 regarding commonly owned U.S. Patent No. 7,013,284. (63 pages).
Preliminary Amendment dated Jan. 21, 2010, for commonly owned U.S. Appl. No. 12/691,515, filed Jan. 21, 2010. 3 pages.
Anonymous, Accountancy, London, "Proposals to admit corporate capital lift off," Nov. 1993, vol. 112, Iss. 1203, p. 57, 1 pg. (3 printed pages).
Anonymous, National Underwriter, "Market Mix," (Property & casualty/risk & benefits management ed.), Erlanger, Jun. 21, 1993, vol. 97, Iss. 25, p. 47, 1 pg. (2 printed pages).
Bloss, A., Hudak, P., Young, J., "Code Optimizations for Lazy Evaluation," Lisp and Symbolic Computation, 1, 147-164 (1988) © Kluwer Academic Publications, The Netherlands.
Duda, R.O., Hart, P.E., Stork, D.G., "Pattern Classification," p. vii-xx, Chapter I, © 2001 John Wiley & Sons, Inc.
Falsey, B., "Promises of 'higher rates of return' miss the point," Anchorage Daily News, Section: IDEAS; p. K3, Mar. 20, 2005 (2 pgs.).
Irina, "Is your insurance Healthy?," © Irina 2003, 4 pgs., URL: http://aids.hallym.ac.kr/succcess/018/40152.html.
Jennings, C.A., "Sep. 11 Insurance Litigation," CRS Report for Congress, 6 pgs., Jun. 14, 2002, Order Code RS21158.
McCall, N., Knickman, J., Bauer, E.J., "GrantWatch I. Essay—Public/Private Partnerships: A New Approach to Long Term Care," Health Affairs, pp. 164-176, Spring 2001.
Rayner, B., While the Industry Had Sufficient Funds Available to Handle the Sept. 11 Claims, Insurers Say They Must Raise Rates Now to Help Rebuild Capacity and to Adjust for Higher Levels of Risk; High Anxiety; Terorism [sic], Rising Premiums Shake Commerical Insurance Markets; [City Edition], Richmond Times-Dispatch, p. D 16, Richmond, VA, Feb. 4, 2002.
Stipulation and Order to Amend Answer and Counterclaims filed Sep. 13, 2010, in lawsuit asserting U.S. Patent No. 7,617,240, captioned *Accenture Global Services GmbH, et al. v. Guidewire Software,* Inc., Case No. 09cv848, D. Del. Nov. 10, 2009. 46 pages. (Dkt. No. 47).
U.S. Office Action mailed Sep. 24, 2010, for Reexamination No. 90/010,735 regarding commonly owned U.S. Patent No. 7,617,240. 18 pages.
U.S. Office Action mailed Oct. 1, 2010, for merged Reexamination Nos. 90/010,201 and 90/010,713 regarding commonly owned U.S. Patent No. 7,013,284. 40 pages.
Request for Continued Examination dated Oct. 14, 2010, for commonly owned U.S. Appl. No. 09/305,146, filed May 4, 1999. 2 pages.
Notice of Allowance issued Oct. 19, 2010, for commonly owned U.S. Appl. No. 09/305,146, filed May 4, 1999. 4 pages.
U.S. Office Action mailed on Nov. 9, 2010, for commonly owned U.S. Appl. No. 12/691,515, filed Jan. 21, 2010. 10 pages.
Examiner Interview Summary mailed Dec. 15, 2010, for merged Reexamination Nos. 90/010,201 and 90/010,713 regarding commonly owned U.S. Patent No. 7,013,284. 56 pages.
Examiner Interview Summary mailed Dec. 15, 2010, for Reexamination No. 90/010,735 regarding commonly owned U.S. Patent No. 7,617,240. 6 pages.
Patent Owner's Response with Appendices dated Dec. 27, 2010, for Reexamination No. 90/010,735 regarding commonly owned U.S. Patent No. 7,617,240. 1,103 pages. (Document filed in 26 parts).
Guidewire's Supplemental Reply Brief in Support of Its Motion for Partial Summary Judgment Regarding Invalidity of the '284 and '111 Patents as Claiming Unpatentable Subject Matter filed Aug. 26, 2010, *Accenture Global Services, Gmbh* et al. v. *Guidewire Software Inc.*, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. (Dkt No. 513). 10 pages.
Accenture's Brief in Opposition to Guidewire's Supplemental Brief in Support of Its Motion for Partial Summary Judgment of Invalidity as Claiming Unpatentable Subject Matter filed Oct. 15, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. (Dkt No. 514). 15 pages.
Guidewire's Amended Answer and Counterclaims to Accenture's Complaint for Patent Infringement filed Nov. 2, 2010, in lawsuit asserting U.S. Patent No. 7,617,240, captioned *Accenture Global Services GmbH*, et al. v. *Guidewire Software, Inc.*, Case No. 09cv848, D. Del. Nov. 10, 2009, (Dkt. No. 59). 17 pages.
Accenture's Opening Brief in Support of Motion to Strike Allegations in Defendant Guidewire's Amended Answer and Counterclaims filed Nov. 15, 2010, in lawsuit asserting U.S. Patent No. 7,617,240, captioned *Accenture Global Services GmbH*, et al. v. *Guidewire Software, Inc.*, Case No, 09cv848, D. Del. Nov. 10, 2009 (Dkt.No. 63). 23 pages.
Plaintiffs Accenture Global Service GmbH and Accenture LLP's Reply to Guidewire's Amended Counterclaims to Accenture's Complaint for Infringement of the '240 Patent filed Nov. 15, 2010, in lawsuit asserting U.S. Patent No. 7,617,240, captioned *Accenture Global Services GmbH*, et al. v. *Guidewire Software, Inc.*, Case No. 09cv848, D. Del. Nov. 10, 2009 (Dkt. No. 65). 8 pages.
Patent Owner's Response with Appendices dated Jan. 3, 2011, for merged Reexamination Nos. 90/010,201 and 90/010,713 regarding commonly owned U.S. Patent No. 7,013,284. 928 pages. (Document filed in 25 parts).
Final Office Action mailed Feb. 4, 2011 for Reexamination No. 90/010,735 regarding commonly owned U.S. Patent No. 7,617,240. 22 pages.
Re-Examination Request U.S. Appl. No. 90/011,484, filed Feb. 10, 2011. 90 pages.
Exhibit D—Archived description of the Diamond product from Applied Systems, published at least by Jul. 15, 1997, filed in U.S. Patent 7,013,284 Re-Examination Request U.S. Appl. No. 90/011,484, filed Feb. 10, 2011. 8 pages.
Exhibit I—Claim Interpretations, filed in U.S. Patent 7,013,284 Re-Examination Request U.S. Appl. No. 90/011,484, filed Feb. 10, 2011. 18 pages.
Exhibit J—Claims Charts for Claims 1-40 based on Flores and Abbruzzese under 35 U.S.C, § 103, filed in U.S. Patent 7,013,284 Re-Examination Request U.S. Appl. No. 90/011,484, filed Feb. 10, 2011. 207 pages.
Exhibit K—Claim Chart for Claims 1-40 based on Flores, Diamond and Abbruzzese under 35 U.S.C. § 103, filed in U.S. Patent 7,013,284 Re-Examination Request U.S. Appl. No. 90/011,484, filed Feb. 10, 2011. 186 pages.
Exhibit L—Claim Chart for Claims 1-40 based on Flores, Borghesi, and Abbruzzese under 35 U.S.C. § 103, filed in U.S. Patent 7,013,284 Re-Examination Request U.S. Appl. No. 90/011,484, filed Feb. 10, 2011. 181 pages.
Exhibit M—Claim Chart for Claims 1-40 based on Lynn and Abbruzzese under 35 U.S.C. § 103, filed in U.S. Patent 7,013,284 Re-Examination Request U.S. Appl. No. 90/011,484, filed Feb. 10, 2011. 138 pages.
Exhibit N—Claim Chart for Charts 1-40 based on Schutzman and Abbruzzese under 35 U.S.C. § 103, filed in U.S. Patent 7,013,284 Re-Examination Request U.S. Appl. No. 90/011,484, filed Feb. 10, 2011. 119 pages.
Exhibit O—Claim Chart for Charts 1-40 based on Caruso and Abbruzzese under 35 U.S.C. § 103, filed in U.S. Patent 7,013,284 Re-Examination Request U.S. Appl. No. 90/011,484, filed Feb. 10, 2011. 102 pages.
Exhibit P—Action Finishes 1995 with Strong December Sales, PR Newswire, Jan. 1996, filed in U.S. Patent 7,013,284 Re-Examination Request U.S. Appl. No. 90/011,484, filed Feb. 10, 2011. 3 pages.
Request for Continued Examination filed Feb. 18, 2011, for commonly owned U.S. Appl. No. 09/305,146. 2 pages.

U.S. Appl. No. 90/010,201, filed Jun. 19, 2008.
U.S. Appl. No. 90/010,713, filed Oct. 9, 2009.
U.S. Appl. No. 90/010,735, filed Nov. 10, 2009.
Smith et al.: Workflow is just a PI process, Jan. 2004, BP Trends, pp. 1-36.
Puustjarvi, Juha: Transactional Workflows, 1999, Department Computer Science, University of Helsinki,Finland, pp. 1-116.
Altiero, S,, Dahle, D.R., Weiss, J.G., "Insight: Unlocking Value—Outsourcing is an important tool to help insurers manage claims," Best's Review, Jun. 2004 Issue.
Merante, J., Castelli, T., "Advantages of express claim handling," IBM, vol. 5, No. 9, http://www-03.ibm.com/industries/financialservices/doc/content/news/newsletter/1135797 Sep. 9, 2004.
Accenture, Gartner, "Insurance Insights: Insights into innovations in the insurance industry from Accenture and Gartner research," vol. 1, No. 3, Jun. 2004 © Accenture 2004.
Accenture, Accenture to Implement Claim Components Solution for OneBeacon Insurance, Jan. 10, 2002, available: http://newsroom.accenture.com/article_print.cfm?article_id=3830.
Georgakopoulos, D., Hornick, M., "An Overflow of Work Management: From Process Modeling to Workflow Automation Infrastructure," Distributed and Parallel Databases, 3, 119-153 (1995) © 1995 Kluwer Academic Publishers, Boston, Manufactured in The Netherlands.
Zhao, J.L., Stohr, E.A., "Temporal Workflow Management in a Claim Handling System," 1999, ACM SIGSOFT Software Engineering Notes, vol. 24, Issue 2, pp. 187-195, WACC '99, Feb. 1999 San Francisco, CA, USA © 1999 ACM 1-58113-070-8/99/0002.
Welch, R.: Beyond Workflow: The Benefits of Straight-Through Automation, Nov./Dec. 2002, Special Supplement to KMWorld, pp. S6-S7.
e-workflow.org: Trigon Blue Cross Blue Shield, Richmond, Virginia, Feb. 1, 2002, pp. 1-14.

\* cited by examiner

AUTOMATED TASK PROCESSOR FOR INSURANCE CLAIMS

This application is a continuation of U.S. patent application Ser. No. 13/071,347, filed Mar. 24, 2011 now U.S. Pat. No. 8,180,668, which is a continuation of U.S. patent application. Ser. No. 11/264,115, filed Nov. 1, 2005 now U.S. Pat. No. 7,933,786, all of which are incorporated herein by reference.

FIELD OF THE INVENTION

The present invention relates generally to insurance, and more particularly, to a collaborative intelligent task processor configured to collaboratively operate to complete one or more tasks associated with an insurance claim.

BACKGROUND

Processing insurance claims is a significant part of the business activities of insurance companies. Efficient processing of insurance claims provides benefits not only in retaining and attracting customers, but also in minimizing costs. In the past, insurance companies have serviced insurance claims the same, regardless of complexity. Recently, however, there has been more focus on handling insurance claims differently based on the complexity of the individual insurance claim.

In general, insurance claims may be grouped into three segments, namely, 1) Core Claims; 2) Express Claims; and 3) Fast Track Claims. Core Claims may include low frequency, higher relative severity claims that are typically handled by a human expert claim handler. An example Core Claim may be a large commercial liability insurance claim with multiple claimants.

Express Claims may include high frequency relatively low severity claims that require human handling, such as insurance claims related to vehicle damage, or personal property loss. Fast Track Claims may include insurance claims of relatively low severity that can be handled without human intervention, such as an insurance claim related to only broken automobile glass or a claim related to a relatively minor theft/vandalism incident. With Fast Track Claims, a basic task, such as matching the loss to the policy of the insured or issuing a payment in response to receipt of an invoice, may be automated to be performed automatically.

However, due to the complexities and multiple separate tasks that are associated with most insurance claims, relatively few insurance claims may be categorized as Fast Track Claims. In addition, insurance claims categorized as Express Claims are still handled by a human, who performs each task manually, regardless of complexity. Accordingly, to maximize efficiency, what is needed is a system that can separate an insurance claim into individual tasks, identify those individual tasks that are capable of being completed in an automated fashion versus those tasks that need a human claim adjuster. Further, what is needed is a system capable of automated completion of more complex tasks by taking into account other aspects of the insurance claim that are not necessarily part of an individual task being automatically completed.

SUMMARY

The present invention provides an insurance claim processing system capable of automated analysis of an insurance claim, identification of events included in the data of the insurance claim, and/or generation of tasks that need to be performed to resolve the insurance claim. In addition, the system is capable of performing automated processing of some, or all of the tasks generated for an insurance claim.

The insurance claim processing system includes a task engine component capable of generating tasks related to an insurance claim. The tasks may be identified as capable of being performed by a human performer, such as a claims adjuster, or an automated performer. One automated performer included in the insurance claim processing system is a collaborative intelligent task processor. The collaborative intelligent task processor may receive tasks capable of being performed by an automated performer.

For each task, the collaborative intelligent task processor may select one or more corresponding action plans from an action plan database. The action plans may include procedures. The procedures may be step-by-step instructions to retrieve information related to an insurance claim. In addition, the procedures may be step-by-step instructions to enable sub-processes to retrieve and/or process data. Sub-results provided by the sub-processes may be used by the collaborative intelligent task processor, along with any other insurance claim related data to process data and/or generate additional data based on the procedures included in an action plan. In addition, the sub-results from one sub-process may be used by the collaborative intelligent task processor to obtain additional sub-results from a different sub-process.

Based on the action plan, the collaborative intelligent task processor may process the retrieved and/or generated data to obtain a task result that is responsive to the task. The action plans are fully configurable and may be developed for use by the collaborative intelligent task processor to obtain a task result for any task, or group of tasks. In addition, the automated collaborative intelligent task processor may develop or modify existing action plans or procedures based on the task, the insurance claim, sub-processing results or any other information related to an insurance claim.

The collaborative intelligent task processor may rely on other components included in the insurance claim processing system to complete tasks. Accordingly, sub-process that are separate and independent of the action plans may be initiated and monitored by the collaborative intelligent task processor. In addition, the collaborative intelligent task processor may execute the procedures included in an action plan to manipulate, change and/or create new data related to an insurance claim. The capability of the collaborative intelligent task processor to tap into the "expertise" of various automated components and data included in the insurance claim processing system, while following a predetermined action plan, enables a task result to be obtained solely by automated processing that may take into account many different facets of an insurance related event.

Due to the leveraged insurance claim processing power provided by the collaborative intelligent task processor, in operable cooperation with the other components of the insurance claim processing system, the tasks that can be performed by the collaborative intelligent task processor may have a much higher level of complexity. In addition, the flexible and fully configurable action plans allow both task specific action plans, generic action plans and everything in between. Because the action plans are provided in terms of individual procedures having separate step-by-step instructions, efficient, repeatable and accurate results may be obtained using automated processing without human intervention.

Further objects and advantages of the present invention will be apparent from the following description, reference being made to the accompanying drawings wherein preferred embodiments of the present invention are clearly shown.

DETAILED DESCRIPTION

Figure 1:
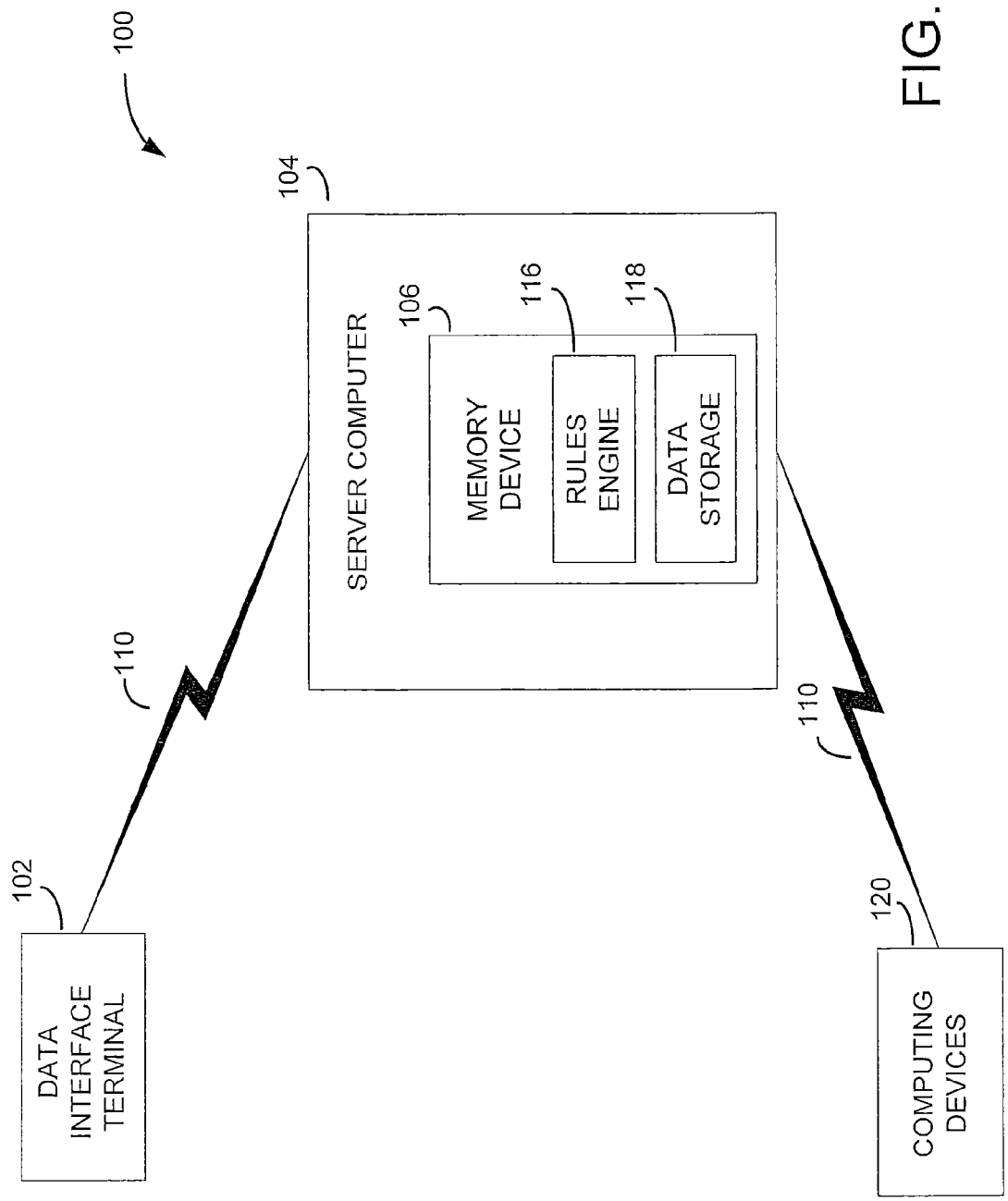
FIG. 1 is a block diagram of an example insurance claim processing system.

FIG. 1 is an example block diagram of an insurance claim processing system 100. The insurance claim processing system 100 is an automated system that may operate on one or more computing devices to process insurance claims. As used herein, the term "insurance claim" refers to any data related to an identified situation, instance, or event that may come within the coverage of a contractual obligation to indemnify, defend or guarantee a party against loss by a specified contingency or peril, and the corresponding activities related to resolving the contractual obligation including first notice of loss, investigations, payments and/or any other functions related thereto. Insurance claims may occur when an insured customer of an insurance organization experiences an incident, such as property loss/damage and/or bodily injury that may be covered by an existing insurance policy issued by an insurance organization. In addition an insurance claim may occur in the context of a warranty contract situation where a good or service has allegedly failed to perform as represented or promised. Example insurance may include automobile insurance, homeowner insurance, business insurance, warranty insurance, liability insurance, medical insurance, etc. The insurance claim processing system may also be used for other types of data processing.

In FIG. 1 the insurance claim processing system 100 includes at least one data interface terminal 102 and at least one server computer 104 all capable of communication over a network 110. In other examples, additional terminals, servers and/or any other devices capable of being coupled with the network 110 may be included in the insurance claim processing system 100. As used herein, the term "coupled", "connected", or "interconnected" may mean electrically coupled, optically coupled, wirelessly coupled and/or any other form of association providing an interface between systems, devices and/or components.

The network 110 may include the Internet, a public and/or private intranet(s), an extranet(s), a dedicated communication line(s) and/or any other configuration to enable transfer of data and commands. Communication within the network 110 may be performed with a communication medium that includes wireline based communication systems and/or wireless based communication systems. The communication medium may be, for example, a communication channel, radio waves, microwave, wire transmissions, fiber optic transmissions, or any other communication medium capable of transmitting data, audio and/or video information.

The data interface terminal 102 may be any device(s) with data viewing, data modification, and data manipulation capability that is also able to communicate over the network 110. Examples of data interface terminals 102 include a terminal, a laptop computer, a desktop computer, a personal digital assistant (PDA), a wireless phone, etc. The data interface terminal 102 may be operated by an organizational entity associated with an insurance organization. The organizational entity may be assigned responsibility for at least a portion of insurance claims submitted to the insurance organization. As used herein, the term "organizational entity," "organizational entities" or "OE" is broadly defined to include an individual employee, any number of individual employees, offices, work groups, teams, etc.

within an insurance organization. The term "organizational entity," "organizational entities" or "OE" may also refer to individuals, offices, work groups, teams, etc. that are external to the insurance organization performing functions based on a relationship with the insurance organization. One example of an organizational entity operating the data interface terminal 102 may be an insurance claim handler responsible for resolving an insurance claim.

The server computer 104 may be any form of computing device(s) capable of receiving requests and transmitting responses over the network 110. Operation of the server computer 104 may be based on instructions selectively executed by at least one processor (not shown) operating within the server computer 104. In addition to executing instructions to provide the functionality commonly provided in computing devices operating as servers on a network, the server computer 104 may execute instructions to enable operation of the insurance claim processing system 100. Instructions executed by the server computer 104 may be stored in a memory device 106.

The memory device 106 may be one or more data storage devices accessible by the server computer 104. The memory device 106 may be at least one magnetic data storage device, such as a hard drive, an optical disk, a tape, etc., and/or at least one electronic memory device such as flash memory, random access memory (RAM), etc. The memory device 106 may be located within the server computer 104 as illustrated. Alternatively, the memory device 106 may be located anywhere within the network 110 that allows communication with the server computer 104 over the network 110. In another alternative, a portion of the memory device 106 may be located within the server computer 104 and other portion(s) of the memory device 106 may be located elsewhere within the network 110.

Included within the illustrated memory device 106 is at least one rules engine 116 and at least one data storage database 118. The rules engine 116 may be executable instructions capable of providing the functionality of the insurance claims processing system 100. In addition, the rules engine 116 may include instructions providing rules and other parameters for operation of the insurance claims processing system 100. The data storage database 118 may be a database, such as a relational database that allows data storage capability for data related to insurance policies and/or insurance claims. In addition, data utilized or generated during operation of the rules engine 116 may be stored in the data storage database 118.

The server computer 104 may also communicate with and/or access other computing devices 120 over the network 110. The computing devices 120 may include legacy computing systems within an insurance claim processing company, such as an insurance company, that include data related to a claimant and/or an insurance claim. In addition, the computing devices 120 may include integration partners of the insurance claim processing company. Integration partners may be providers of goods and/or services, such as a vehicle windshield repair shop, a medical services provider, a damage estimator, a vehicle tow service or a vehicle auto body shop that is capable of being electronically authorized to perform work, supply materials, submit invoices and/or be issued payment for work performed and/or materials provided. The computing devices 120 also may be public sources of information external to the insurance claim processing company that are accessible over the network 110, such as databases related to estimated vehicle costs, or criminal records. The computing devices 120 may also include private or proprietary sources of information such as databases related to a claimant's credit report, or a vendor database, such as repair contractors, providers of medical services, or any other insurance claim services.

When an insurance claim is submitted to an insurance organization, data related to the insurance claim may be entered into the data interface terminal 102. With an insurance claim of an insured, the data may include identification of the insured, the insurance policy number, details of the insurance claim, etc. The data may be transmitted over the network 110 to the server computer 104. The server computer 104 may execute instructions within the rules engine 116 to store the data within the data storage database 118 of the memory device 106.

The server computer 104 also may execute instructions to manipulate and/or augment the data related to the insurance claim to identify additional properties associated with the stored data. As used herein, the term "properties" or "property" is broadly defined to include the entered data associated with an insurance claim as well as identified attributes, parameters, classifications, categorizations, pattern results, etc., that are associated, a result of, and/or are derived from the stored data.

Figure 2:
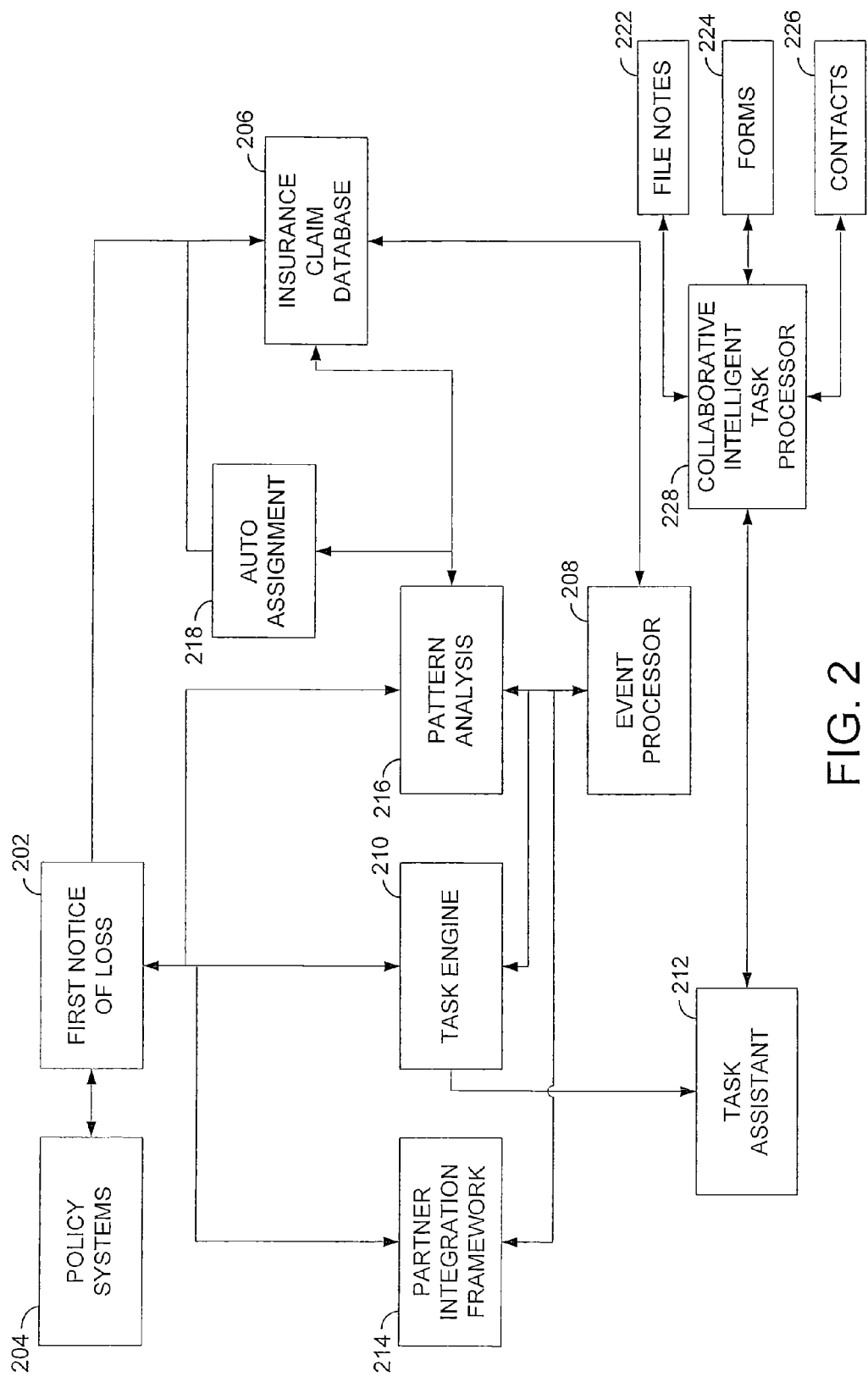
FIG. 2 is a block diagram illustrating example functionality of a server computer included in the insurance claim processing system depicted in FIG. 1.

FIG. 2 is a block diagram of an example functionality included in the server 104. The server 104 includes a first notice of loss component 202, a contract system component 204, an insurance claim database 206, an event processor component 208, a task engine component 210, a task assistant component 212, a partner integration framework component 214, a pattern analysis component 216, an automatic assignment component 218, a file notes component 222, a forms component 224, a contacts component 226 and a collaborative intelligent task processor 228. The various components may be stored as instructions in the memory device 106, and may be selectively executed by the server computer 104. In other examples, additional or fewer components may be illustrated to depict the functionality of the server 104 as described herein.

The first notice of loss (FNOL) component 202 may be enabled to allow an insurance claim to be initially entered into the insurance claims processing system 100 by an organizational entity using the data interface terminal 102 (FIG. 1). For example, a call center operator may enter the basic information related to an insurance claim of an insured, such as the name of the insured, the date of the insurance claim, the facts related to the insurance claim, etc. using the FNOL component 202. Alternatively, the information related to an insurance claim may be received in another medium such as written correspondence, and entered using the FNOL component 202.

The FNOL component 202 may also analyze the data being input, and provide real-time lookup and/or verification of insurance policy coverage and/or contractual obligation related information. For example, while the organizational entity in the call center is discussing the insurance claim with the insured, the FNOL component 202 may provide the organizational entity with the insured's policy information.

The FNOL component 202 may enable the contract system component 204 to access the contract related information, such as the policy related information of a claimant. Accordingly, the contract information may be stored, accessed and manipulated by the contract system component 204. Alternatively, the contract system component 204 may be an interface to another computing system, such as a legacy system, within an insurance company or other insurance claim processor to enable access storage and/or retrieval of the contract related information.

In addition, the FNOL component 202 may interactively provide prompts to the organizational entity to query the claimant for additional information. As additional information is entered by the organizational entity, additional prompts may be generated. Information entered with the FNOL component 202 may be stored in the insurance claim database 206. The insurance claim database 206 may be part of the data storage 118 of FIG. 1, and may store all information related to an insurance claim.

Information stored in the insurance claim database 206 related to an insurance claim, including the data captured with the FNOL component 202 may be iteratively monitored and analyzed by the event processor component 208. The event processor component 208 may generate an event or identify an investigation. An event or investigation may be generated by the event processor component 208 when there is a change in the state of an insurance claim. In other words, when the data in the insurance claim database 206 is changed "significantly", as determined by the event processor component 208, an event or investigation may be generated. Events and investigations may also be generated manually. Events and investigations may be generated by the event processor component 208 based on automated evaluation of the data by the event processor component 208. For example, changes in overall complexity, the severity of the loss, the extent of the loss, the loss history of the claimant, etc. may trigger generation of an event or an investigation. Thus, each insurance claim can trigger generation of different events and/or investigations based on the nature of the insurance claim, the specific facts involved, the claimant and/or any other data related to the insurance claim.

The task engine component 210 is executable to iteratively monitor and generate tasks, or execution tasks, based on generated events and investigations. As used herein, the terms task, or execution task refers to each of the discrete activities that are to be performed to complete the processing of an insurance claim. Thus, each insurance claim may include different tasks, or combinations of tasks, based on the events and/or investigations generated. The automated task generation may be based on account servicing requirements, company policy, company best practices, regulatory requirements, and customizable task profiles in view of the data associated with the insurance claim. A task library of tasks may be accessed by the task engine component 210. Tasks may be selected from the task library based on rules that match conditions in the insurance claim to one or more of the tasks in the task library. Example tasks include correspondence tasks, phone tasks, ad hoc tasks, authority tasks, research tasks, data gathering tasks, claim allocation tasks, policy match to loss tasks, claim closing tasks, invoice payment tasks, etc.

The task assistant component 212 may receive, organize and manage the execution of tasks generated by the task engine component 210. The execution tasks may be included in a task plan created by the task assistant component 212. A task plan may be created for each insurance claim or each part of an insurance claim. The task plan may include one or more tasks that are specifically selected to represent the steps that are to be executed to complete the processing of a specific insurance claim or a specific part of an insurance claim. Tasks in the task plan may be date sensitive and may serve a diary function with respect to each insurance claim or each portion of an insurance claim. Accordingly, the task assistant component 212 may provide automated scheduling and tracking of insurance claim related activities. In addition, the task assistant component 212 may provide organization and management of complex insurance claims or parts of complex insurance claims.

As the data in the insurance claim database 206 related to an insurance claim is added, updated and/or changed, the event processor component 208 may analyze the data and generate additional events. In response to the events, the task engine component 210 may generate tasks to include in the task plan. In addition, the task engine component 210 may delete or change existing tasks in the task plan in response to events. Tasks that are generated, changed or deleted are provided to the task assistant component 212 to update the task plan.

Each task in the task plan may include identification of a performer to complete the task. The performer may be a specific organizational entity, a category of organizational entities or another component included in the server computer 104. The task assistant component 212 may also create and maintain a historical record of tasks that are completed. The historical record may include an indication of the performer that completed the task, the insurance claim associated with the task, file notes, date of completion, etc.

Some of the tasks may identify the FNOL component 202 as the performer. Such tasks may instruct the FNOL component 202 to push data and/or work to external suppliers (integration partners) of the insurance claim processing company. The FNOL component 202 may push such data and/or work to the external business partners using the partner integration framework component 214. For example, FNOL component 202 may arrange for a vehicle tow, a rental vehicle or vehicle repairs at a repair shop for an insurance claim related to a vehicle accident.

The partner integration framework component 214 may be an interface to the computing devices 120 (FIG. 1) that are maintained by one or more of the external business partners of the insurance company. Alternatively, the partner integration framework component 214 may include a communication port, a terminal or other interface device that allows external business partners to communicate with the server 104.

The FNOL component 202 may also enable the pattern analysis component 216. The pattern analysis component 216 may identify patterns from the data included in the insurance claim database 206. The patterns may be used to segment and/or categorize all or parts of the insurance claim. As used herein, "categorizing" or "categorization" refers to classification of an insurance claim into a predetermined category(s) that has been identified by a insurance claim processing organization. In general, various patterns may be developed that are representative of different segments within insurance claims. The patterns may be matched to an insurance claim. Outcomes from each of the patterns may be aggregated to generate pattern results to further categorize the insurance claim.

The pattern analyzer component 216 may analyze the data associated with an insurance claim and return one or more pattern results. To obtain the pattern results, the properties associated with individual insurance claims may be divided into segments or dimensions that may also be referred to as pattern types. Each of the segments may be identified by matching the properties associated with the insurance claim to one or more associated patterns that may also be referred to as components. Each of the matched patterns may provide an outcome resulting from analysis of the data associated with the insurance claim that is matched to the pattern.

The outcomes from each of the patterns may be aggregated to form pattern result(s). Aggregation may involve automated analysis of the outcomes with respect to each other to arrive at a result that is representative of the patterns when considered in totality. For example, in an insurance claim, a first outcome from a first pattern may be indicative of unusually high financial losses. A second outcome from a second pattern may be indicative of an unusually high number of previous insurance claims. Aggregation of the first and second outcomes may therefore indicate a pattern result of high potential for fraud. The pattern result(s) may provide additional information that can be used in many different aspects of the processing of an insurance claim.

The pattern results and the data in the insurance claim database 206 may be used by the auto assignment component 218 to identify target organizational entities best able to handle the insurance claim. Target organizational entities may be identified based on matching the data and pattern results identified for the insurance claim with the skill set of organizational entities. The skill set of an organizational entity(s) may be matched to an insurance claim based on, for example, identified skills, expertise, experience, efficiency, grouping with other similar insurance claims, geographic location, or any other criterion related to the organizational entity(s). The insurance claims may be automatically assigned to any organizational entity, such as internal or external adjusters, vendors and/or any other third parties without the need for human intervention. Automated assignment may be performed with a systematic process of choosing an organizational entity(s) based on the pattern results and insurance claim data.

Once assigned, the organizational entity may use the task plan provided by the task assistant component 212 to work through the processing of the insurance claim. The organizational entity may also reorganize the task plan, delete tasks and add tasks to the task plan. In addition, the organizational entity may enable the file notes component 222.

The file notes component 222 may be a word processor based functionality that allows the organizational entity to generate, maintain and/or send file notes related to the insurance claim. The file notes may include fields and/or free form text entries. The file notes component 222 may include word processing functionality such as spell checking, word wrap, etc. In addition, the file notes component 222 may allow categorization of the file notes based on key fields, searching, sorting, etc.

The organizational entity may also enable the forms component 224. The forms component 224 may be enabled to automatically generate forms, letters and other types of template documents. The templates may be included in a template library for ready access. The templates may be located using context sensitive menus to navigate through the available templates. Upon selection of a template, the forms component 224 may automatically access data in the insurance claim database 206 to populate the template chosen for a particular insurance claim with some of the header information related to the insurance claim. Example insurance claim specific header information that may be automatically populated into a selected template by the forms component 224 includes an address, insurance claim number, date of loss, name of the claimant, name of the insured, policy number, etc.

The contacts component 226 may be populated with contact information, such as name, telephone number, etc. of the claimant, individuals involved in the insurance claim, witnesses, business partners involved in the insurance claim, or any other individuals or entities associated with the insurance claim. The contact information may be automatically extracted from the insurance claim database 206 and stored in a contacts database associated with the insurance claim. The contact information may be manually or automatically accessed as needed.

The pattern analysis component 216 may also categorize the insurance claim as one that includes tasks that are eligible for performance by an automated performer. One automated performer is the previously discussed FNOL component 202. Another automated performer is the collaborative intelligent task processor 228.

The collaborative intelligent task processor 228 is automated to perform tasks. The tasks performed by the collaborative intelligent task processor 228 may represent the entire insurance claim. The collaborative intelligent task processor 228 may also perform a selected task associated with an insurance claim, while other tasks associated with an insurance claim may be performed by a human organizational entity. Tasks attempted to be performed by the collaborative intelligent task processor 228 may also be redirected to a human organizational entity based on predetermined triggers, thresholds and/or scenarios related to and/or determined during performance of the task by the collaborative intelligent task processor 228.

Tasks may be assigned or allocated to the collaborative intelligent task processor 228 by the task assistant component 212 and/or the auto assignment component 218. Alternatively, the collaborative intelligent task processor 228 may analyze the tasks in the task plan and select those tasks that are capable of automated performance. Tasks capable of automated performance may be determined based on analysis of the task by the collaborative intelligent task processor 228 and/or identified with a flag or other indicator associated with a task. Accordingly, tasks may be allocated for automated processing by other components in the insurance claim processing system, an organizational entity, and/or by the collaborative intelligent task processor 228 itself.

Automated performance of tasks by the collaborative intelligent task processor 228 may involve automated analysis of the task and automated selection of an action plan corresponding to the task. The action plan may include a plurality of procedures or subroutines that enable the collaborative intelligent task processor 228 to acquire and/or process information related to the insurance claim. In addition, the action plan may include one or more procedures executable by the collaborative intelligent task processor 228 to process the acquired information, the data from the insurance claim database 206 and/or pattern matching data to yield a result. The task result may be responsive to the task. Alternatively, the result may be additional data that is leveraged by the collaborative intelligent task processor 228 to acquire additional information and/or further process the acquired information, the data from the insurance claim database 206 and/or pattern matching data to yield a further result. The collaborative intelligent task processor 228 may iteratively acquire, generate and/or process data related to an insurance claim based on one or more tasks until the action plan is completed.

For example, the partnership integration component 214 may receive and associate an invoice with an insurance claim stored in the insurable event database. The event processor 208 may identify the invoice as an event, and the task engine 210 may generate a task to process the invoice for payment.

The task assistant may assign the task to the collaborative intelligent task processor 228. The collaborative intelligent task processor 228 may receive the task and select an action plan responsive to the task. In this example, an action plan to process an invoice may be selected by the collaborative intelligent task processor 228.

The procedures and subroutines included in the selected action plan may enable the intelligent task processor 228 to confirm the invoice is correct and process the invoice for payment without human intervention. Confirmation that the invoice is correct may involve comparing the work performed with the insurance claim, confirming the amount does not exceed a determined amount, confirming a deductible was met, etc. Processing the invoice for payment may involve generating a check for the correct amount made out to the correct entity with a mailing envelop or transmittal instructions to transmit the check to the entity.

Figure 3:
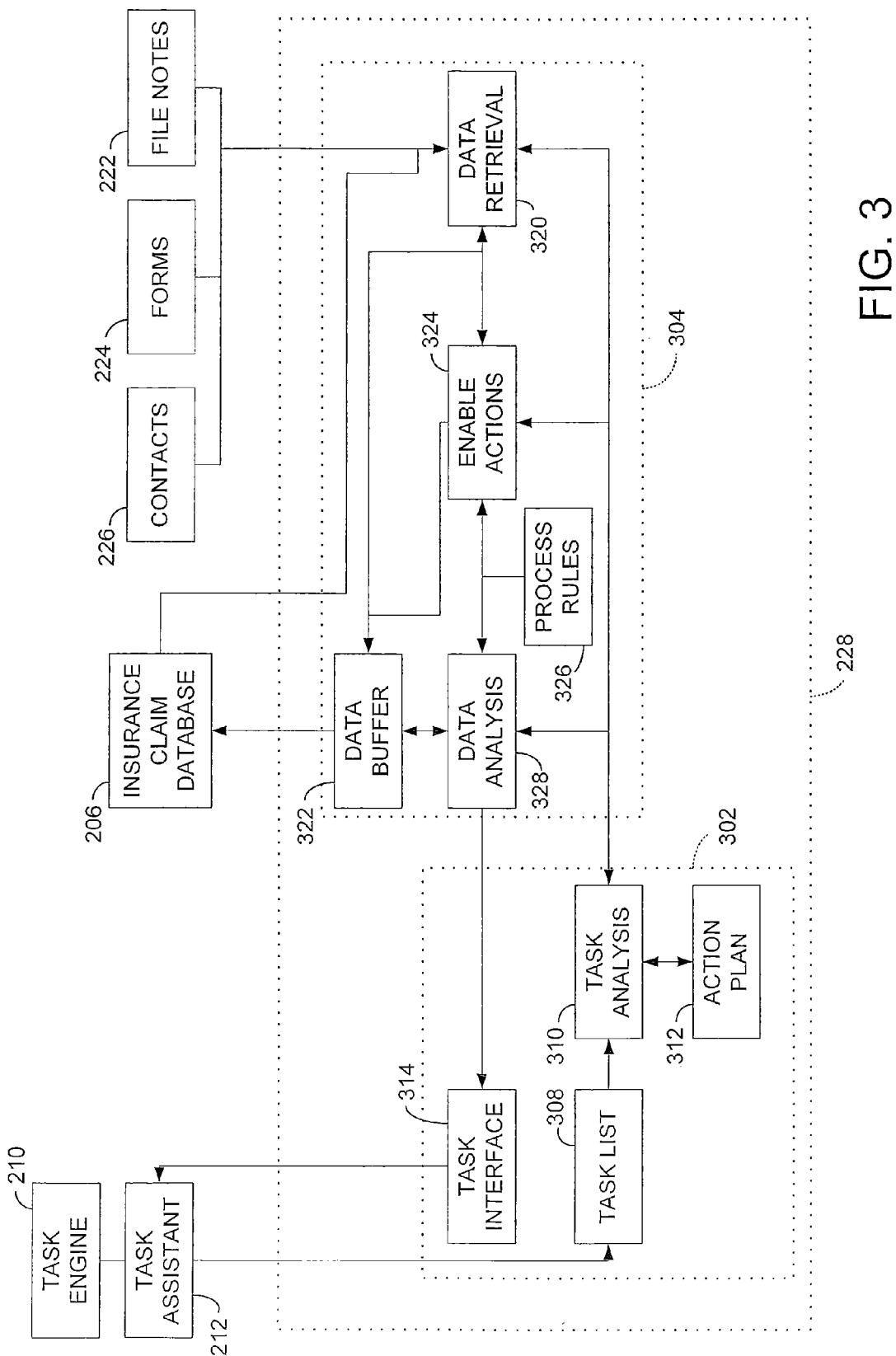
FIG. 3 is a block diagram of a portion of the functionality of the server computer depicted in FIG. 2 and the functionality of a collaborative intelligent task processor depicted in FIG. 1.

FIG. 3 is a block diagram illustrating a portion of the server 104 that includes the insurance claim database 206, the task engine component 210, the task assistant component 212, the file notes component 222, the forms component 224, and the contacts component 226. In addition, FIG. 3 includes the functionality of an example collaborative intelligent task processor 228. In other examples, fewer or greater numbers of components could be used to describe the functionality described herein.

The illustrated collaborative intelligent task processor 228 includes a task handler component 302 and a data handler component 304 that are fully automated. In general, the task handler component 302 is executable to automatically analyze and process a task provided to the collaborative intelligent task processor 228. In addition, the task handler component 302 may determine and/or develop an action plan for each task.

The data handler component 304 is automatically executable to request, receive, analyze, and/or transmit data available from various sources based on procedures included in the action plan. In addition, the data handler component 304 is executable to initiate automated sub-processing by other components in the server 104 in order to obtain data. Further, the data handler component 304 is automatically executable to logically analyze the data received from a number of requests to derive and/or generate a result that is responsive to the task. The data handler component 304 may also forward data received from one sub-process to another sub-process for additional processing.

The task handler component 302 includes a task list component 308, a task analysis component 310, an action plan database 312 and a task interface component 314. As previously discussed, tasks may be generated by the task engine component 210 and included in a task plan by the task assistant component 212. The tasks may be acquired and/or provided to the task handler component 304.

The task handler component 304 may wait to receive tasks transmitted from the task assistant 212. Such tasks may be stored in a task queue accessible by the task list component 308. Alternatively, the task handler component 304 may be executable to review task plans of those insurance claims that have been identified by pattern matching with the pattern analysis component 216 (FIG. 2) as having tasks that are performable by an automated performer. Based on the automated review, the task handler component 304 may select tasks to be stored in the task queue.

Selection of tasks to be stored in the task queue may be based on a predetermined list of tasks that have been identified as capable of being performed by the collaborative intelligent task processor 228. Alternatively, automated selection of the tasks by the task list component 308 may be based on the existence of a predetermined parameter, such as a flag, that is included in tasks capable of being completed by the collaborative intelligent task processor 228. In another alternative, the task list component 308 may analyze the task and determine if the task is capable of being performed by the collaborative intelligent task processor 228. Analysis may be based on, for example, comparison of the available action plans to the tasks in the task plan.

The task analysis component 310 may analyze each task and determine at least one corresponding action plan capable of being used to complete the task. Determination of at least one corresponding action plan may be based on a parameter such as a task type identifier included with the task. The task type identifier may identify the type of task that is to be performed and a corresponding one or more action plans associated with the task. Based on the task type identifier, the task analysis component 310 may further analyze the task to identify a subset of action plans capable of performing the task. For example, the task type may identify the task as an invoice related task, a set reserve type task, etc. In the case of an invoice type task, the task analysis component 310 may further analyze to determine if the invoice is a medical services invoice, a legal services invoice, a car repair invoice, etc. Based on the analysis, different action plans may be chosen. In other examples, one or more other predetermined parameters may be associated with each task. The predetermined parameter(s) may, for example, specifically identify one or more action plans capable of being executed to complete the task.

Alternatively, the task analysis component 310 may utilize pattern matching performed by the pattern analysis component 216 (FIG. 2) as a basis for selection of one or more action plans. For example, the task may be to determine and set a reserve amount (maximum possible payout) for an insurance claim. The pattern analysis component 216 may have performed pattern matching that indicates that the insurance claim is an automobile damage claim, without bodily injury, involving only two vehicles, where the vehicle damage is moderate. Based on the pattern matching results, one or more action plans may be selected to determine a reserve amount for the insurance claim.

In another alternative, the task analysis component 310 may analyze the data in the insurance claim database 206 as the basis for choosing one or more action plans. For example, where the task is to determine and set a reserve, the task analysis component 310 may determine that the insurance claim is a homeowner fire and choose one or more action plans associated with retrieval and analysis of data related to damage to private dwellings. The task analysis component 310 may use any combination of the type, other predetermined parameters, data associated with the insurance claim and/or pattern matching results as the basis for selection of one or more action plans.

The action plans may include one or more procedures. The procedures may be specific instructions to be performed in an automated fashion in a determined sequence to complete the task. Where there are multiple procedures in an action plan, the procedures may be step-by-step sequential and/or parallel instructions to obtain one or more results. For example, in the case of a damaged vehicle bumper insurance claim, a first procedure in a selected action plan may be an instruction to access the insured's policy information and determine the deductible for vehicle collision. A second procedure may be an instruction to access the insurance claim database to obtain a make, a model and a year of the vehicle that was damaged. A third procedure in the action plan may be an instruction to access a business partners database and obtain the costs of a new bumper and associated installation for the vehicle make, model and year retrieved in the second procedure. A fourth procedure may be an instruction to apply the deductible retrieved in the first procedure to the total cost and calculate a payout, and a fifth procedure may be to issue a check to the business partner for the calculated payout. The previous example was a simple illustration and should in no way be construed as a limitation. Since action plans are fully configurable, any number of procedures with any level of complexity related to any task may be included in an action plan.

The action plan database 312 may also include individual procedures and/or groups of procedures. In response to analysis of a task, the task analysis component 310 may build an action plan from the procedures and/or groups of procedures. The action plan may be built based on the task, data requests included in the task, the type of task, pattern matching results, insurance claim data and/or one or more other parameters associated with the task and or the procedures. For example, the parameter(s) in a task may identify one or more specific procedures and/or groups of procedures, match procedures to tasks, etc.

Alternatively, the procedures and/or groups of procedures may be arranged in categories, such as vehicle damage related, dwelling damage related, insurance claim allocation related, insurance claim closing related, invoice payment related, etc. The parameter(s) may identify a category that may be used in conjunction with the pattern matching results and/or the insurance claim data to select one or more procedures and/or groups of procedures. Additional procedures and/or groups of procedures also may be added and/or removed from a predetermined action plan by the task analysis component 310 based on the task, the type, data requested in the task, pattern matching results, the insurance claim data and/or one or more parameters associated with the task, the action plan, the procedures and/or the groups of procedures. Existing procedures and/or groups of procedures that are in action plans or not, also may be modified by the task analysis component 310 based on the task, the type, data requested in the task, pattern matching results, the insurance claim data and/or one or more parameters associated with the task, the action plan, the procedures and/or the groups of procedures.

The task analysis component 310 may also develop a portion of an action plan from procedures and/or groups of procedures that are specific to the particular insurance claim and associated task. The portion of the developed action plan may be combined with an existing action plan that is of a more generic nature. In the case of a task that is identified as an invoice type task, different procedures may be included in the action plan if the invoice is for different goods or services. For example, a task related to a medical invoice may include procedures regarding analysis of usual and customary charges for the medical procedure performed. A task related to a vehicle towing invoice, on the other hand, will have no similar procedures. However, a portion of the action plan that is developed, such as confirmation of authorization to pay, auto payment procedures, etc. may be generic to any invoice payment task regardless of the insurance claim. Accordingly, a portion of an action plan may be developed based on the specific task, and a portion of the action plan may be an already existing action plan identified based on the task type of the task.

When multiple action plans are developed and/or selected by the task analysis component 310, the actions plans may be ranked in a hierarchal ranking by the task analysis component 310. The hierarchal ranking may be determined by the task analysis component 310 based on a score developed by the task analysis component 310. The score may be based on a degree of applicability of the procedures in an action plan to the specific circumstances present in an insurance claim. For example, with a task to determine and set a reserve in a vehicle damage insurance claim that is related to vehicle damage to a motor home, an action plan that included procedures related to determining the costs associated with vehicle damage to motor homes would be ranked higher than actions plans related to vehicle damage generally.

The hierarchal ranking may also be based on comparison of specific information and/or parameters associated with the action plan and the task, data requests included in the task, pattern matching results, insurance claim data and/or one or more parameters associated with the task. In other examples, any other measurement criteria to ascertain the action plan that would best perform the task may be used to assign a hierarchal rank to the action plans. The procedures and/or groups of procedures used to develop the action plans may also be hierarchal ranked as previously discussed.

The procedures included in the action plans may be generally categorized as procedures to acquire data, and procedures to process data to obtain a result. Acquisition and processing may be performed by the collaborative intelligent task processor 228, and/or other components included in the server computer 104 (FIG. 2). Each of the procedures in an action plan may be performed and/or delegated by the data handler 304. The data handler component 304 includes a data retrieval component 320, a data buffer component 322, an enable actions component 324, a process rules component 326, and a data analysis component 328. In other examples additional or fewer components may be depicted to represent the functionality of the data handler component 304.

The data retrieval component 320 enables retrieval of data from the insurance claim database 206 and/or any other computing devices 120 (FIG. 1) on the network 110 (FIG. 1). For example, the data retrieval component 320 may access the Property Loss Claims Bureau (PLRB) over the Internet and obtain data as part of an action plan related to a homeowner's insurance claim. In another example, a database of a widget vendor may be accessed to determine statistics related to the past occurrence of similar failures of a widget while under warranty. In addition, the data retrieval component 320 enables retrieval and/or generation of data with the file notes component 222, with the forms component 224, and with the contacts component 226.

With regard to the file notes component 222, the data retrieval component 320 may access existing notes and obtain associated data. In addition, the data retrieval component 320 may create additional notes as part of the procedures in an action plan. For example, the action plan may include procedures to generate structured file notes that include data obtained by other procedures in the action plan. As another example, an electronic document obtained as a result of a procedure may be attached to the file as a note in the file notes component 222 by the data retrieval component 320.

The data retrieval component 320 may also cooperatively operate with the forms component 224 based on procedures included in an action plan. For example, an action plan to prepare a form letter may include procedures to obtain data, such as a deductible amount, or an estimated total cost to include in the form letter. In addition, when such a letter is to be sent, whom the letter is sent to, method of delivery, address, etc. may be determined with the data retrieval component 320 based on procedure(s) in the action plan.

The data retrieval component 320 may not only enable retrieval of the appropriate data, but may also fill in the form letter with the retrieved data. Alternatively, the data retrieval component 320 may perform the functions of filling in the body of the form letter and also retrieve and fill in the header information, such as the address information, etc. in place of the forms component 224. Accordingly, using the automated functionality of the data retrieval component 320, user entry screens and other forms of manual data entry may be avoided.

The data retrieval component 320 may also retrieve contact data from the contacts component 226. As previously discussed, the contact data may be used by the data retrieval component 320 in conjunction with preparing forms, such as a form letter. In addition, the data retrieval component 320 may populate the contacts component 226 with contact information retrieved by the data retrieval component 320. For example, the data retrieval component 320 may retrieve information related to the owner of vehicle involved in an accident while being driven by someone else. Such contact information may be stored in the contacts component 226.

Data retrieved with the data retrieval component 320 may be stored in the data buffer component 322. The data buffer component 322 may also store any other data generated, retrieved or otherwise processed by the data handler component 320. The data buffer component 322 may store information in the memory device 106 (FIG. 1).

The enable actions component 324 is executable to enable automated subroutines and/or other sub-processes related to an action plan. The subroutines and/or sub-processes may be completely independent from, and not associated with, an action plan. The sub-processes may provide additional data related to the insurance claim. In addition, the sub-processes may provide sub-results. The sub-results may be used in additional automated sub-processes and/or automated processing by the collaborative intelligent task processor 228. For example, the enable actions component 324 may follow the procedures in an action plan to move data stored in the data buffer component 322 to the insurance claim database to trigger an event by the event processor 208 (FIG. 2). The event may in turn trigger generation of a task by the task engine 210 directing the pattern analysis component 216 to perform additional pattern analysis of the data in the insurance claim database.

In this example, the enable actions component 324 may follow additional procedures in the action plan to enable the data retrieval component 320 to retrieve the results of the pattern analysis (sub-results) from the insurance claim database 206 for further processing. Accordingly, enablement of multiple independent sub-processes with the enable actions component 324 based on sequential and/or parallel procedures in an action plan may be leveraged to perform automated iterative processing. The iterative processing may be used to generate, obtain and/or derive new data related to an insurance claim without including the details of such subroutines and/or sub-processes as procedures in the action plan. The sub-routines may provide sub-results. The sub-results may be logically combined by the collaborative intelligent task processor 228 to derive a task result responsive to the task.

The subroutines and/or sub-processes enabled by the enable action plan component 324 may also include exit points to terminate the automated sub-process, or the automated processing of a task by the collaborative intelligent task processor 228. For example, a sub-process may determine that an insurance claim includes bodily injury and that the task should therefore not be performed automatically by the collaborative intelligent task processor 228 without human intervention. In this situation, the collaborative intelligent task processor 228 may be stopped from further processing the task, and the task may be automatically re-assigned to a human organizational entity. The sub-routine may also indicate or cause to be indicated to the human organizational entity the reason for termination of processing of the task by the collaborative intelligent task processor 228.

In other examples, the enable actions module 324 may trigger the generation of additional tasks for a human organizational entity, the collaborative intelligent task processor 228 and/or any other automated or non-automated performer. Additional tasks may be triggered by triggering additional pattern analysis with the pattern analysis component 216 (FIG. 2), storing additional data in the insurance claim database, etc. The enable actions component 324 also may trigger the cancellation or modification of tasks generated by the task engine 210. In still another example, the enable actions component 324 may trigger analysis of data by the data analysis component 328.

The enable actions component 324 may use logic based rules included in the process rules component 326 to trigger activity by other components. The logic based rules may be predetermined statements in a format that is compatible with the component being enabled to perform sub-processing by the enable actions component 324. For example, storage of data in insurance claim database may include logic based rules that are SQL statements to store the data in a relational database. The logic based rules may also indicate to the enable actions component 324 conditions that trigger the automated execution of sub-processes, for example, changes to the data in the insurance claim database 206 that will trigger the generation of events by the event processor 208. The logic based rules may be data driven. For example, automated selection of logic based rules to apply may be based on the data associated with the insurance claim and/or retrieved by the data retrieval component 320.

The data analysis component 328 is executable to analyze data retrieved by the data retrieval component 320. The data analysis component 328 may also generate additional data that is stored in the data buffer component 322. The additional data may include a task result that is responsive to the task.

Processing by the data analysis component 328 may be based on procedures included in the action plan selected for a particular task, data associated with the insurance claim, and/or logic based rules included in the process rules component 326. The logic based rules may provide unit conversions, (such as centimeters to inches, or Euros to US Dollars), data combination mechanisms, and/or any other data manipulation related rules. Processing by the data analysis component 328 may also include communication with the task interface 314.

The task interface component 314 may communicate with the task assistant 212 to allow automated deletion of existing tasks, modifications to existing tasks and updates to the history of a task. The task plan may also be reorganized in an automated fashion at the direction of the task interface component 314. Updates to the history of a task include indication that the task is completed, the date, and any other pertinent information may also be performed with the task interface component 314. Accordingly, the data analysis component 328 may enable the task interface component 314 to indicate to the task assistant 212 that a task is completed, other task should be modified or deleted, and/or to provide any other information related to the history of a task.

Figure 4:
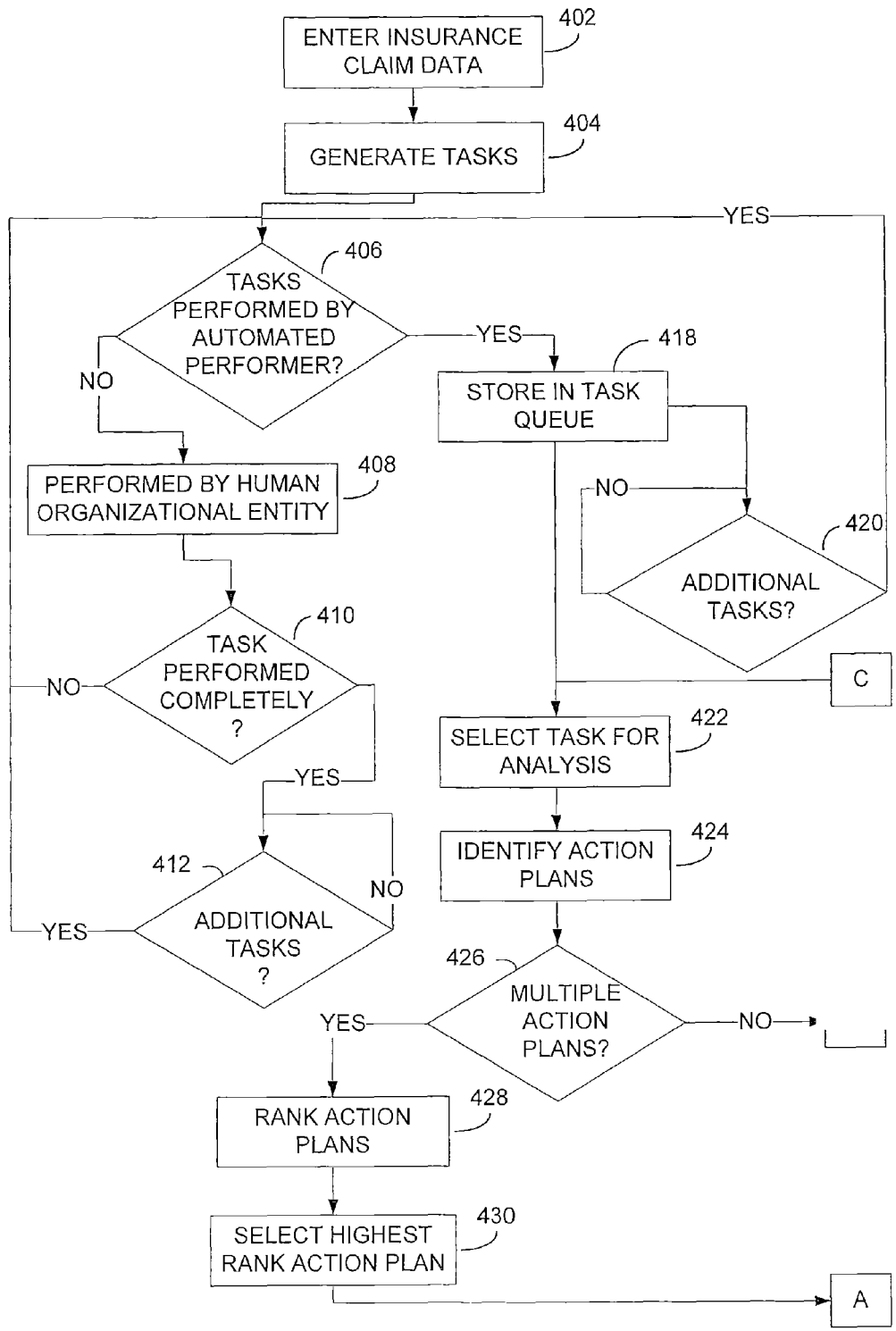
FIG. 4 is an operational flow diagram of the insurance claim processing system of FIG. 1.

FIG. 4 is an operational flow diagram illustrating example operation of the collaborative intelligent task processor 228 within the insurance claims processing system 100 as depicted in FIGS. 1-3. The operation begins at block 402 when an insurance claim is entered into the insurance claim processing system 100. At block 404, tasks are generated by the task engine component 210 and formulated into a task plan by the task assistant component 212. It is determined if a task can be identified as being capable of execution by an automated performer at block 406. As previously discussed, determination of the capability of an automated performed to perform the task may be by the task assistant component 212, the auto assignment component 218 and/or the automated performer. Identification may be performed by the task engine component 210 and/or the task assistant component 212, or may be performed by the collaborative intelligent task processor 228. If the task is not identified as being performable by an automated performer, the task may be performed by a human organizational entity at block 408.

At block 410 the task assistant component 212 may determine if the entire task was performed by the human organizational entity. If the task was completed, it is determined if there are additional tasks that have not yet been identified as performable by an automated performer at block 412. If not, the operation continues to monitor for additional tasks at block 412. If there are additional tasks, the operation returns to block 406 to determine if another task can be identified as being capable of execution by an automated performer. If at block 410, the human organizational entity performed only some portion of the task, the operation returns to block 406 so that the task may be re-evaluated to identify if the task is now performable by an automated performer.

If at block 406, a task is identified as being capable of execution by an automated performer, the task may be stored in the task queue of the task list component 308 at block 418. At block 420 it is determined if there are additional tasks that have not yet been identified as performable by an automated performer. If not, the operation continues to monitor for additional tasks at block 420. If there are additional tasks, the operation returns to block 406 to determine if another task can be identified as being capable of execution by an automated performer. In addition, to determining if there are additional tasks at block 420, the operation may also select a task for analysis with the task analysis component 310 at block 422.

At block 424, the task analysis component 310 may access the action plan database 312 to identify one or more action plans that are capable of performing the task. The action plans may be determined from the task, data related to the insurance claim, pattern matching results, a data type associated with the task, data requested with the task, parameters included in the task and/or the action plan(s). At block 426 it is determined if there are multiple action plans that have been identified. If so, the action plans are ranked at block 428. The hierarchal ranking may be based on a score developed for each action plan, comparison of specific information and/or parameters associated with the action plan and/or the task, data requests included in the task, pattern matching results, insurance claim data and/or one or more parameters associated with the task or the action plan. At block 430, the highest ranked action plan may be selected.

Figure 5:
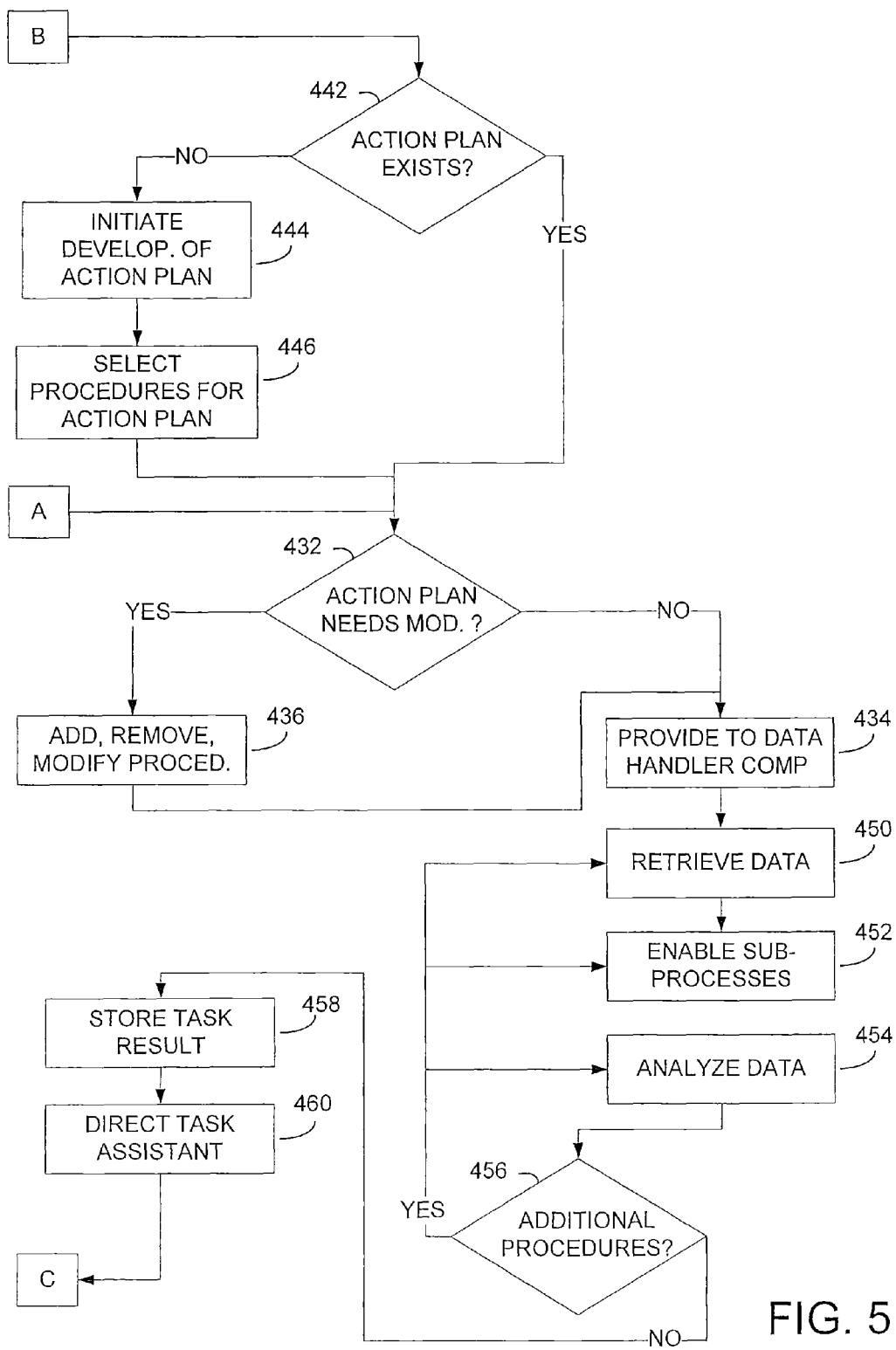
FIG. 5 is a second portion of the operational flow diagram illustrated in FIG. 4.

Referring to FIG. 5, the action plan may be evaluated to determine if the action plan needs modification at block 432. Modification may, for example, involve adding task and insurance claim specific procedures and/or groups of procedures to an otherwise generic action plan. If no modification is needed, the action plan is provided to the data handler component 304 at block 434. If the action plan needs to be modified to most effectively perform the task, procedures are selectively added, removed and or modified by the task analysis component 310 at block 436. The operation then proceeds to block 434 to provide the modified action plan to the data handler component 304.

Returning to block 426, if multiple action plans are not identified, it is determined if one action plan was identified at block 442. If an action plan was identified, the operation proceeds to block 432 to determine if the identified action plan needs modification to complete the task. If no action plan was identified, the task analysis module 310 may initiate development of an action plan at block 444. At block 446, procedures and/or groups of procedures may be selected for inclusion in the action plan being developed. Selection of the procedures or groups of procedures may be based on the task, the task type, data requested in the task, pattern matching results, the insurance claim data, one or more parameters associated with the task, the action plan, the procedures and/or the groups of procedures. Once the action plan is developed, the operation may continue to block 432 to determine if the developed action plan needs modification.

Returning again to block 434, procedures in the action plan related to data retrieval may be performed by the data retrieval component 320 at block 450. At block 452, the procedures related to enabling sub-routines and/or sub-processes with the enable actions component 324 may be performed. The data analysis component 328 may analyze, process and modify the retrieved data based on procedure(s) in the action plan, logic based rules and/or the data related to the insurance claim at block 454. At block 456, it is determined if additional procedures to retrieve data, enable sub-processes, and/or analyze data to arrive at a task result are to be performed. If yes, the data retrieval component 320, the enable actions component 324 and the data analysis component 328 are selectively automatically executed to perform the procedures. If no additional procedures in the action plan are to be performed, the task result is stored in the insurance claim database 206 at block 458. At block 460, the task interface component 314 is enabled direct the task assistant 212 to delete, add and/or modify tasks, and the history data related to the task just completed by the collaborative intelligent task processor 228. The operation then returns to block 422 to select another task from the task queue and the operation continues.

In another example of an insurance claim processing system, the insurance claim processing system includes an insurance claim database configured to receive, store and provide information related to an insurance claim. The system also includes a pattern analyzer executable with a computer to segment the insurance claim into predetermined categories based on the information stored in the insurance claim database. In addition, the system includes a task engine component executable with a computer to generate tasks to be performed based on the information stored in the insurance claim database and the segmentation of the insurance claim.

A collaborative intelligent task processor executable with a computer to receive a task generated by the task engine component and an action plan database accessible by the collaborative intelligent task processor is also included in the system. The action plan database includes a plurality of predetermined action plans, and the collaborative intelligent task processor is executable to select one of the action plans as a function of the task, information related to the insurance claim, and the predetermined categories. The action plan comprises a plurality of procedures that are each performed or directed by the collaborative intelligent task processor. The selected one of the action plans is performable by the collaborative intelligent task processor to complete the task.

The collaborative intelligent task processor is also executable to acquire additional information related to the insurance claim. The additional information is useable by the collaborative intelligent task processor with at least one of the information related to the insurance claim, and the predetermined categories to complete the task. The collaborative intelligent task processor is further configured to store data responsive to the task in the insurance claim database.

The previously discussed collaborative intelligent task processor and insurance claim processing system may allow the skills of human organizational entities to be allocated to those tasks and/or insurance claims with higher levels of complexity. By relying on the other components in the insurance claim processing system the complexity level of tasks capable of being performed by the collaborative intelligent task processor may be dramatically increased. In addition, due the highly configurable nature of the action plans used by the collaborative intelligent task processor to complete tasks, the number, complexity levels and diversity of tasks capable of being completed successfully by the collaborative intelligent task processor is almost unlimited. The collaborative intelligent task processor also provides the capability to dynamically develop and/or modify action plans to allow the collaborative intelligent task processor to adapt an action plan to the specific circumstances of a task associated with a specific insurance claim. Further, due to the checks and balances provided by the sub-processes executed by the collaborative intelligent task processor in arriving at a task result, erroneous task results and or erroneous task performance by the collaborative intelligent task processor may be avoided.

While the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. An insurance claim processing system, comprising:
   at least one computer including a processor and a memory device;
   an insurance claims database operating on the at least one computer, the insurance claims database configured to store insurance claim data;
   an action plan database operating on the at least one computer, the action plan database storing a plurality of action plans, wherein each of the action plans includes one or more automated procedures performed to complete a task related to processing an insurance claim;
   a pattern analysis component operating on the at least one computer, the pattern analysis component configured to identify patterns from the insurance claim data stored in the insurance claims database; and
   an automated task processor stored on the memory device and executable by the processor, the automated task processor configured to:
   identify an insurance claim processing task performable by an automated performer based on pattern matching performed by the pattern analysis component;
   obtain insurance claim data related to the identified insurance claim processing task from the insurance claims database;
   for the identified insurance claim processing task, select an action plan from the action plan database based on the obtained insurance claim data;
   for the selected action plan, identify a set of one or more automated procedures included in the action plan; and
   cause execution of the identified set of automated procedures included in the action plan.

2. The insurance claim processing system of claim 1, wherein the selected action plan includes a first procedure that causes the automated task processor to acquire information related to an insurance claim, a second procedure that causes the automated task processor to trigger execution of an automated sub-process external to the selected action plan that provides additional data related to the insurance claim, and a third procedure that causes the automated task processor to process the acquired information and the provided additional data to yield a result responsive to the identified task, wherein the provided additional data is stored in the insurance claims database.

3. The insurance claim processing system of claim 2, wherein the second procedure triggers execution of the automated sub-process based on automated analysis by the automated task processor of information acquired by the first procedure.

4. The insurance claim processing system of claim 2, wherein the automated task processor is further configured to supply the information acquired by the first procedure to the automated sub-process, and wherein the automated sub-process uses the information acquired by the first procedure to provide the additional data related to the insurance claim.

5. The insurance claim processing system of claim 1, wherein the insurance claims database and the action plan database are included in a single database.

6. A method of processing insurance claims, comprising:
   providing a computer;
   the computer communicating with a database, the database configured to store insurance claim data and a plurality of action plans, wherein each of the action plans includes one or more automated procedures performed to complete a task related to processing an insurance claim;
   identifying patterns from insurance claim data stored in the insurance claims database with a pattern analysis component executed with the computer;
   identifying an insurance claim processing task performable by an automated performer with an automated task processor, the insurance claim processing task identified based on pattern matching performed by the pattern analysis component;
   obtaining insurance claim data related to the identified insurance claim processing task from the database with the automated task processor;
   selecting, for the identified insurance claim processing task, an action plan from the database with the automated task processor based on the obtained insurance claim data;
   the automated task processor identifying, for the selected action plan, a set of one or more automated procedures included in the action plan; and
   causing execution of the identified set of automated procedures included in the action plan.

7. The method of claim 6, wherein the step of identifying, for the selected action plan, the set of one or more automated procedures included in the action plan comprises identifying a plurality of action plans, and ranking the action plans based on a degree of applicability of each of the action plans.

8. The method of claim 7, wherein the step of ranking the action plans comprises developing a score for each of the plurality of action plans based at least in part on the identified patterns.

9. The method of claim 6, wherein the step of selecting, for the identified insurance claim processing task, an action plan from the database comprises building an action plan from the one or more automated procedures included in the database.

10. The method of claim 9, wherein the step of building an action plan comprises selecting automated procedures based at least in part on the identified patterns.

11. The method of claim 9, wherein the step of building an action plan comprises selecting an existing action plan, and adding additional automated procedures to the action plan.

12. An insurance claim processing system embodied in instructions stored on a memory storage device, the instructions executable by a computer with a processor, comprising:
   a memory storage device, instructions stored in the memory storage device that are executed by the processor to cause the processor to identify patterns from insurance claim data stored in an insurance claims database, the database configured to store insurance claim data and a plurality of action plans;
   instructions stored in the memory storage device that are executed by the processor to cause the processor to execute a pattern analysis component to identify an insurance claim processing task performable by an automated performer, the insurance claim processing task identified based on the identified patterns;
   instructions stored in the memory storage device that are executed by the processor to cause the processor to obtain insurance claim data related to the identified insurance claim processing task from the database;
   instructions stored in the memory storage device that are executed by the processor to cause the processor to select, for the identified insurance claim processing task, an action plan from the database based on the obtained insurance claim data, wherein each of the action plans includes one or more automated procedures performed to complete a task related to processing an insurance claim;
   instructions stored in the memory storage device that are executed by the processor to cause the processor to identify, for the selected action plan, a set of one or more automated procedures included in the action plan; and
   instructions stored in the memory storage device that are executed by the processor to cause execution of the identified set of automated procedures included in the action plan.

13. The insurance claim processing system of claim 12, further comprising instructions stored in the memory storage device that are executed by the processor to cause comparison of the insurance related data to predetermined parameters associated with the identified insurance claim processing task to select the action plan.

14. The insurance claim processing system of claim 13, wherein the predetermined parameters specifically identify the action plan to be used.

15. The insurance claim processing system of claim 13, wherein the predetermined parameters comprises a task type identifier included with the identified insurance claim processing task that identifies the type of task to be performed.

16. The insurance claim processing system of claim 12, further comprising instructions stored in the memory storage device that are executed by the processor to cause the identified insurance claim processing task to be re-directed to a human organization entity based on at least one of predetermined triggers, thresholds, or scenarios.

17. The insurance claim processing system of claim 12, further comprising instructions stored in the memory storage device that are executed by the processor to cause the action plan to be selected based at least partially on the identified patterns.

18. The insurance claim processing system of claim 12, further comprising instructions stored in the memory storage device that are executed by the processor to cause modification of the selected action plan.

19. The insurance claim processing system of claim 12, wherein the automated procedures comprise procedures to acquire data and procedures to process data to obtain a result responsive to the insurance claim processing task.

20. The insurance claim processing system of claim 12, wherein the selected action plans comprise a plurality of selected action plans, and the insurance claim processing system further comprises instructions stored in the memory storage device that are executed by the processor to cause hierarchical ranking of the selected action plans in accordance with the identified patterns.

* * * * *